US012562824B2

(12) United States Patent　　　　(10) Patent No.:　　US 12,562,824 B2
Ge et al.　　　　　　　　　　　　　(45) Date of Patent:　　*Feb. 24, 2026

(54) SYSTEMS AND METHODS FOR WIRELESS SIGNAL CONFIGURATION BY A NEURAL NETWORK

(71) Applicants:Yiqun Ge, Kanata (CA); Wuxian Shi, Kanata (CA); Wen Tong, Kanata (CA)

(72) Inventors: Yiqun Ge, Kanata (CA); Wuxian Shi, Kanata (CA); Wen Tong, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,342

(22) Filed: May 13, 2024

(65) Prior Publication Data

US 2024/0372635 A1　　Nov. 7, 2024

Related U.S. Application Data

(63) Continuation of application No. 18/080,932, filed on Dec. 14, 2022, now Pat. No. 12,021,572, which is a
(Continued)

(51) Int. Cl.
　　*H04B 17/26*　　　　(2015.01)
　　*H04B 17/373*　　　(2015.01)
　　　　　　(Continued)
(52) U.S. Cl.
　　CPC ........... *H04B 17/26* (2015.01); *H04B 17/373* (2015.01); *H04L 25/0254* (2013.01); *H04L 25/03165* (2013.01); *H04W 24/10* (2013.01)
(58) Field of Classification Search
　　CPC .... H04B 17/26; H04B 17/373; H04B 17/309; H04B 17/3913; H04L 25/0254;
(Continued)

(56)　　　　　References Cited

U.S. PATENT DOCUMENTS 10,616,257 B1　4/2020　Soulhi et al.
11,146,287 B2　10/2021　Song et al.
　　　　　(Continued)

FOREIGN PATENT DOCUMENTS

CN　　105373830 A　　3/2016
CN　　108229675 A　　6/2018
EP　　2523360 A1　　11/2012

OTHER PUBLICATIONS

Lecun, Yann, et al, "Efficient BackProp", journal article, published in 1998 (exact month of publication in the year 1998 is unknown), 44 pages.

(Continued)

*Primary Examiner* — Linda Wong

(57)　　　　　　ABSTRACT

A wireless network can generate candidate signal configurations for physical transmissions to or from a user equipment (UE) in a radio environment. The generation of candidate signal configurations can be performed using a first neural network that is associated with the UE. These signal configurations can then be evaluated using a second neural network that is associated with the radio environment. The second neural network can be trained using measurements from previous physical transmissions in the radio environment. The trained second neural network generates a reward value that is associated with the candidate signal configurations. The first neural network is then trained using the reward values from the second neural network to produce improved candidate signal configurations. When a signal configuration that produces a suitable reward value is generated, this signal configuration can be used for the physical transmission in the radio environment.

23 Claims, 17 Drawing Sheets

Related U.S. Application Data continuation of application No. 16/412,908, filed on May 15, 2019, now Pat. No. 11,533,115.

(51) Int. Cl.

| | | |
|---|---|---|
| *H04L 25/02* | (2006.01) | |
| *H04L 25/03* | (2006.01) | |
| *H04W 24/10* | (2009.01) | |

(58) Field of Classification Search

CPC . H04L 25/03165; H04W 24/10; G06N 3/044; G06N 3/048; G06N 3/006; G06N 3/045; G06N 3/084; G06N 3/092; G06N 3/047

See application file for complete search history.

(56) References Cited

U.S. PATENT DOCUMENTS

| | | | |
|---|---|---|---|
| 11,259,269 B2 | 2/2022 | Chun | |
| 11,507,626 B2 | 11/2022 | Xing et al. | |
| 2018/0019910 A1* | 1/2018 | Tsagkaris | H04W 64/006 |
| 2018/0174046 A1 | 6/2018 | Xiao et al. | |
| 2019/0149425 A1* | 5/2019 | Larish | G06N 3/045 |
| | | | 706/16 |
| 2019/0208438 A1 | 7/2019 | Yang et al. | |
| 2019/0261197 A1 | 8/2019 | Bellamkonda et al. | |
| 2020/0112907 A1* | 4/2020 | Dao | H04M 15/8016 |
| 2020/0259545 A1* | 8/2020 | Bai | H04B 7/063 |
| 2020/0312336 A1 | 10/2020 | Kang et al. | |

OTHER PUBLICATIONS

Sutton, Richard S. and Barto, Andrew G., "Reinforcement Learning: An Introduction", book, published in 2018 (exact month of publication in the year 2018 is unknown), 548 pages, The MIT Press, Cambridge, Massachusetts, United States of America.

China Mobile et al, "Solution for Key Issue 8: Performance improvement and supervision of mIoT terminals", SA WG2 Meeting #128, S2-187261, Jul. 2-6, 2018, Vilnius, Lithuania, total 8 pages.

* cited by examiner

1100

1300

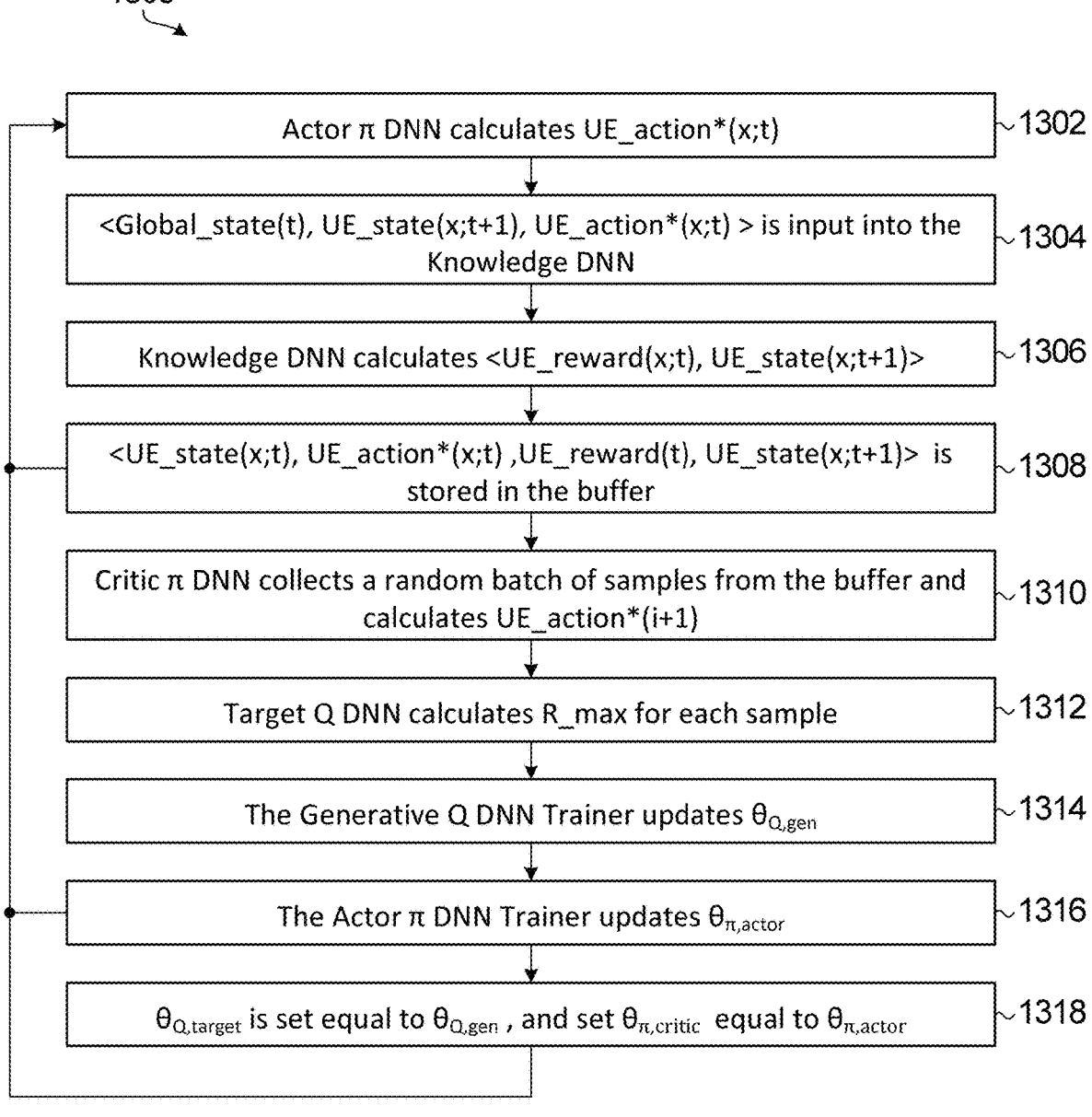

Actor π DNN calculates UE_action*(x;t) ~1302

<Global_state(t), UE_state(x;t+1), UE_action*(x;t) > is input into the Knowledge DNN ~1304

Knowledge DNN calculates <UE_reward(x;t), UE_state(x;t+1)> ~1306

<UE_state(x;t), UE_action*(x;t) ,UE_reward(t), UE_state(x;t+1)> is stored in the buffer ~1308

Critic π DNN collects a random batch of samples from the buffer and calculates UE_action*(i+1) ~1310

Target Q DNN calculates R_max for each sample ~1312

The Generative Q DNN Trainer updates $\theta_{Q,gen}$ ~1314

The Actor π DNN Trainer updates $\theta_{\pi,actor}$ ~1316

$\theta_{Q,target}$ is set equal to $\theta_{Q,gen}$ , and set $\theta_{\pi,critic}$ equal to $\theta_{\pi,actor}$ ~1318

FIG. 13

1700

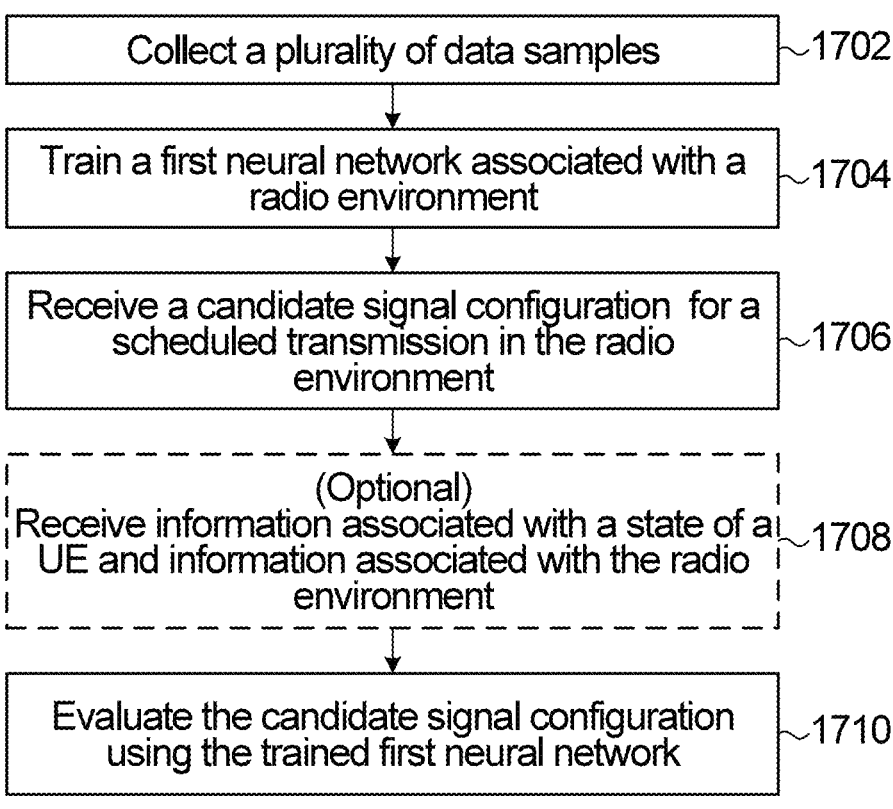

| Collect a plurality of data samples | ~1702 |

↓

| Train a first neural network associated with a radio environment | ~1704 |

↓

| Receive a candidate signal configuration for a scheduled transmission in the radio environment | ~1706 |

↓

| (Optional)<br>Receive information associated with a state of a UE and information associated with the radio environment | ~1708 |

↓

| Evaluate the candidate signal configuration using the trained first neural network | ~1710 |

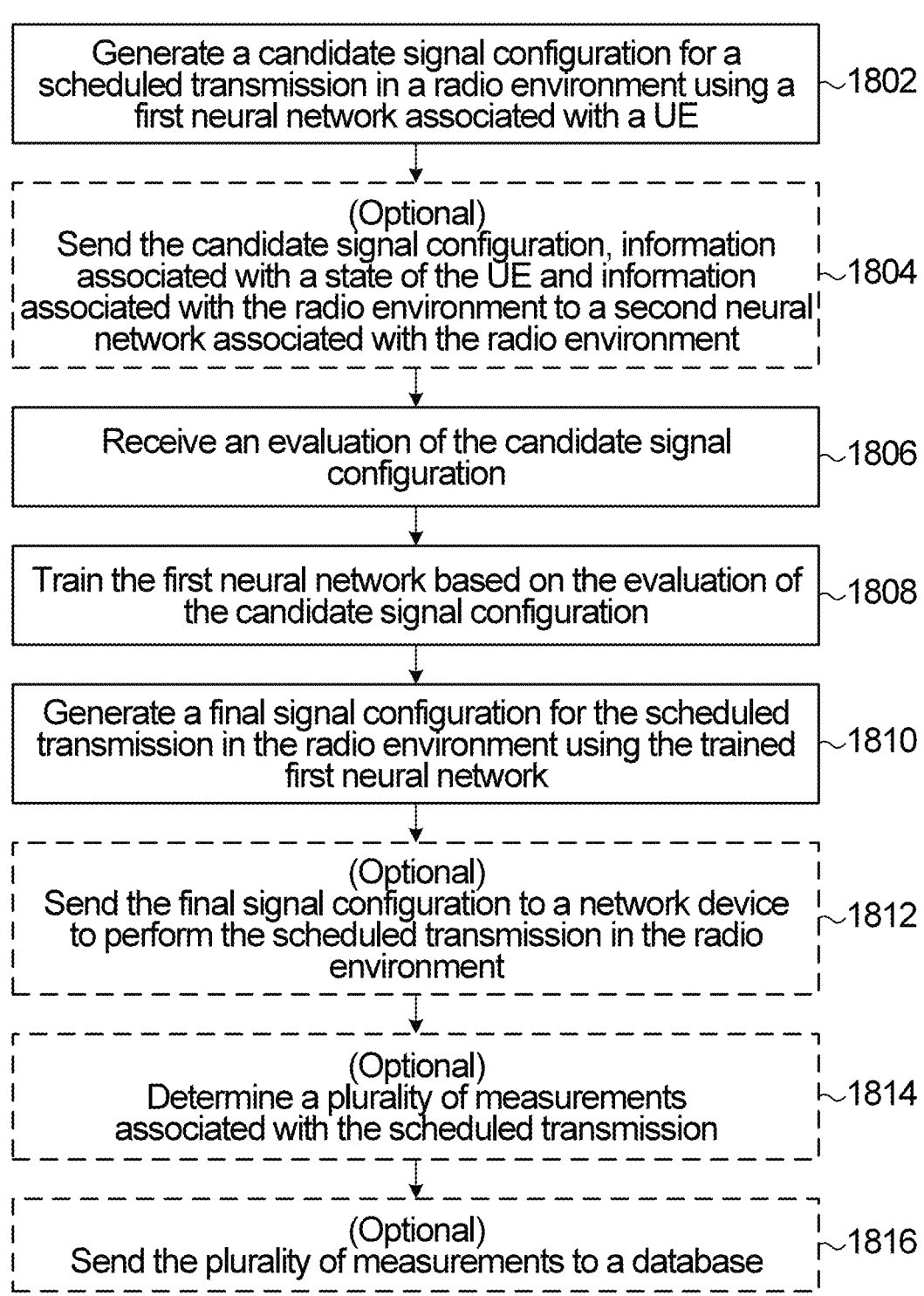

Generate a candidate signal configuration for a scheduled transmission in a radio environment using a first neural network associated with a UE ~1802

(Optional)
Send the candidate signal configuration, information associated with a state of the UE and information associated with the radio environment to a second neural network associated with the radio environment ~1804

Receive an evaluation of the candidate signal configuration ~1806

Train the first neural network based on the evaluation of the candidate signal configuration ~1808

Generate a final signal configuration for the scheduled transmission in the radio environment using the trained first neural network ~1810

(Optional)
Send the final signal configuration to a network device to perform the scheduled transmission in the radio environment ~1812

(Optional)
Determine a plurality of measurements associated with the scheduled transmission ~1814

(Optional)
Send the plurality of measurements to a database ~1816

FIG. 15

SYSTEMS AND METHODS FOR WIRELESS SIGNAL CONFIGURATION BY A NEURAL NETWORK

CROSS-REFERENCE TO RELATED APPLICATIONS

The present application is a continuation of U.S. patent application Ser. No. 18/080,932, filed Dec. 14, 2022, which is a continuation of U.S. patent application Ser. No. 16/412,908, filed May 15, 2019, the contents of which are both hereby included herein by reference.

FIELD

The application relates generally to systems and methods for communications, and in particular to wireless signal configuration.

BACKGROUND

A wireless communication system can support transmissions between a base station and a user equipment (UE). The state of the channel between the base station and UE can influence how these transmissions are configured. Wireless systems typically rely on feedback to determine an estimate of the channel between the base station and UE. This feedback could include channel state information (CSI), which can be reported by the UE to the base station. CSI reference signals (CSI-RSs), for example, can be transmitted by the network for use by a UE to determine the CSI.

CSI and/or other forms of feedback are used by a network to design or configure signals for transmission from the base station to the UE, or from the UE to the base station. The configuration of signals could include the allocation of time-frequency resources and the configuration of a coding scheme, for example.

SUMMARY

The estimation of a channel in a wireless network can be a difficult process that depends, in part, on the radio environment of the channel. Reference signal transmission and reporting is one method that can be used to estimate a channel. However, reference signals might not capture all of the changes occurring in the environment. In addition, the use of reference signals could be expensive in terms of network resource consumption. Without accurate representations of the environment, the design or configuration of signals between a base station and a UE is challenging. As such, a need exists for methods and systems that can estimate a radio environment quickly and inexpensively, and to enable the generation of improved signal configurations.

According to one aspect of the present disclosure, there is provided a method including: collecting a plurality of data samples, each data sample including information associated with a respective physical transmission in a radio environment; training a first neural network associated with the radio environment using a subset of the plurality of data samples; receiving, from a second neural network associated with a user equipment (UE), a candidate signal configuration for a scheduled transmission in the radio environment; and evaluating, using the trained first neural network, the candidate signal configuration to produce an evaluation of the candidate signal configuration for training the second neural network.

In some embodiments, the UE is a first UE, and at least one data sample of the plurality of data samples includes information associated with a physical transmission to or from a second UE in the radio environment.

In some embodiments, the information associated with the physical transmission to or from the second UE includes: a first state of the second UE before the physical transmission to or from the second UE; transmission parameters associated with the physical transmission to or from the second UE; a second state of the second UE after the physical transmission to or from the second UE; and a metric representing an effectiveness of the physical transmission to or from the second UE in the radio environment.

In some embodiments, the metric includes a weighted sum of a plurality of measurements associated with the physical transmission to or from the second UE.

In some embodiments, collecting the plurality of data samples includes: receiving the plurality of data samples from a plurality of network devices; and storing the plurality of data samples in a database.

In some embodiments, storing the plurality of data samples in the database includes deleting a plurality of older data samples from the database.

In some embodiments, the plurality of network devices includes a base station and a plurality of UEs.

In some embodiments, the method further includes receiving, from the second neural network, information associated with a state of the UE and information associated with the radio environment.

In some embodiments, evaluating the candidate signal configuration includes inputting the candidate signal configuration, the information associated with the state of the UE and the information associated with the radio environment into the trained first neural network; and the evaluation of the candidate signal configuration includes a metric representing a predicted effectiveness of the candidate signal configuration in the radio environment and information associated with a predicted state of the UE after performing the scheduled transmission to or from the UE using the candidate signal configuration.

In some embodiments, the UE is a first UE and the scheduled transmission is a first scheduled transmission, the method further including: receiving, from a third neural network associated with a second UE, a candidate signal configuration for a second scheduled transmission in the radio environment; and evaluating, using the trained first neural network, the candidate signal configuration for the second scheduled transmission to produce an evaluation of the candidate signal configuration for the second scheduled transmission for training the third neural network.

In some embodiments, the method is performed at a base station.

According to another aspect of the present disclosure, there is provided a method including: generating, using a first neural network associated with a user equipment (UE), a candidate signal configuration for a scheduled transmission in a radio environment; receiving, from a second neural network associated with the radio environment, an evaluation of the candidate signal configuration; training the first neural network based on the evaluation of the candidate signal configuration; and generating, using the trained first neural network, a final signal configuration for the scheduled transmission in the radio environment.

In some embodiments, the method further includes sending the final signal configuration to a network device to perform the scheduled transmission in the radio environment.

In some embodiments, the network device includes the UE and the scheduled transmission is performed from the UE; or the network device includes a base station and the scheduled transmission is performed from the base station to the UE.

In some embodiments, the method further includes determining, after the network device performs the scheduled transmission, a plurality of measurements associated with the scheduled transmission; and sending the plurality of measurements to a database associated with the second neural network.

In some embodiments, training the first neural network includes training the first neural network using a reinforcement learning model.

In some embodiments, the method further includes sending, to the second neural network, the candidate signal configuration, information associated with a state of the UE and information associated with the radio environment.

In some embodiments, the evaluation of the candidate signal configuration includes a metric representing a predicted effectiveness of the candidate signal configuration in the radio environment and information associated with a predicted state of the UE after performing the scheduled transmission to or from the UE using the candidate signal configuration.

In some embodiments, the method further includes generating, using the trained first neural network, another final signal configuration for another scheduled transmission in the radio environment.

In some embodiments, the method is performed at a base station.

According to yet another aspect of the present disclosure, there is provided a system including: a processor; and at least one computer readable storage medium storing: a database including a plurality of data samples, each data sample including information associated with a respective physical transmission in a radio environment; a first neural network associated with the radio environment; and programming for execution by the processor, the programming including instructions to perform actions in accordance with any one of the methods described herein.

According to a further aspect of the present disclosure, there is provided a system including: a processor; and at least one computer readable storage medium storing: a first neural network associated with a user equipment (UE); and programming for execution by the processor, the programming including instructions to perform actions in accordance with any one of the methods described herein.

According to aspects of the present disclosure, there is provided a method. The method includes collecting a plurality of data samples, each data sample, among the plurality of data samples, providing information associated with a respective physical transmission in a radio environment and training, using a subset of the plurality of data samples, a first neural network associated with the radio environment, the training resulting in a trained first neural network. The method further includes obtaining, from a second neural network specific to a user equipment (UE) a candidate signal configuration for a scheduled transmission to or from the UE in the radio environment, information associated with a state of the UE and information associated with the radio environment. The method further includes inputting, into the trained first neural network, the information associated with the state of the UE and the information associated with the radio environment. The method further includes obtaining, from the trained first neural network, an evaluation of the candidate signal configuration for training the second neural network.

In some embodiments, the evaluation includes a metric representing a predicted effectiveness of the candidate signal configuration in the radio environment and information associated with a predicted state of the UE after performing the scheduled transmission to or from the UE using the candidate signal configuration.

According to aspects of the present disclosure, there is provided a system. The system includes a processor and at least one computer readable storage medium. The at least one computer readable storage medium stores a database storing a plurality of data samples, each data sample, among the plurality of data samples, providing information associated with a respective physical transmission in a radio environment, a first neural network associated with the radio environment and programming for execution by the processor. The programming including instructions to train, using a subset of the plurality of data samples, a first neural network associated with the radio environment, the training resulting in a trained first neural network and obtain, from a second neural network specific to a user equipment (UE) a candidate signal configuration for a scheduled transmission to or from the UE in the radio environment, information associated with a state of the UE and information associated with the radio environment. The programming further including instructions to input, into the trained first neural network information associated with a state of the UE and information associated with the radio environment. The programming further including instructions to obtain, from the trained first neural network, an evaluation of the candidate signal configuration for training the second neural network.

In some embodiments, the evaluation includes a metric representing a predicted effectiveness of the candidate signal configuration in the radio environment and information associated with a predicted state of the UE after performing the scheduled transmission to or from the UE using the candidate signal configuration.

According to aspects of the present disclosure, there is provided a computer readable storage medium. The computer readable storage medium for storing a database storing a plurality of data samples, each data sample, among the plurality of data samples, providing information associated with a respective physical transmission in a radio environment, a first neural network associated with the radio environment and programming for execution by a processor. The programming includes instructions to train, using a subset of the plurality of data samples, a first neural network associated with the radio environment, the training resulting in a trained first neural network and obtain, from a second neural network specific to a user equipment (UE) a candidate signal configuration for a scheduled transmission to or from the UE in the radio environment, information associated with a state of the UE and information associated with the radio environment. The programming further includes instructions to input, into the trained first neural network, information associated with a state of the UE and information associated with the radio environment and obtain, from the trained first neural network, an evaluation of the candidate signal configuration for training the second neural network.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which:

FIG. 13 is a flow diagram illustrating an example method for training a policy gradient DNN; and FIGS. 14 and 15 are flow diagrams illustrating example methods according to embodiments of the present disclosure.

DETAILED DESCRIPTION

Figure 1A:
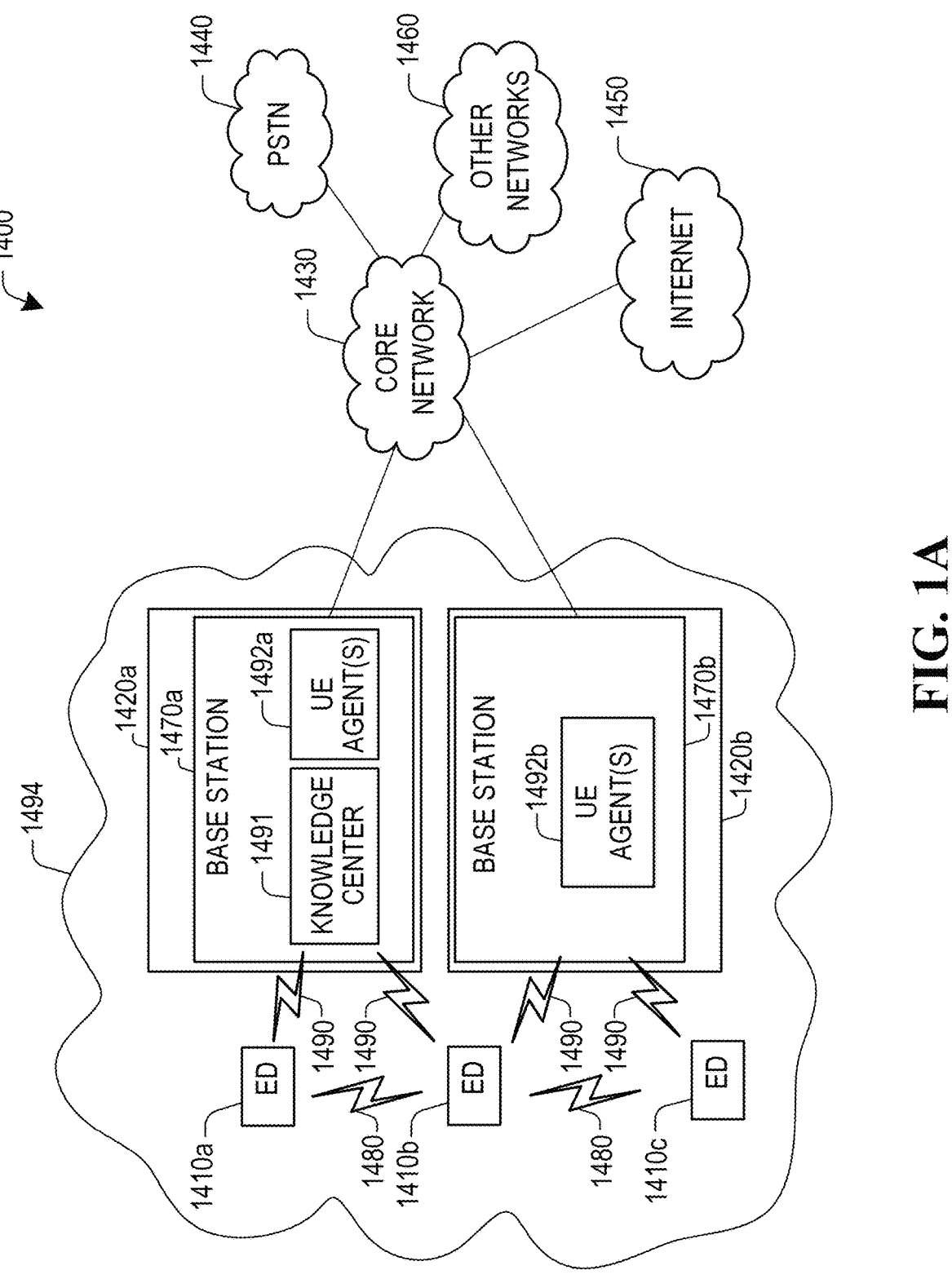
FIG. 1A is a block diagram illustrating an example communication system in which embodiments of the present disclosure could be implemented.

A cellular wireless system can be a relatively complex environment to optimize. For example, in a region with multiple base stations, thousands of moving or stationary UEs could be connected to the network, any or all of which could be sending and/or receiving high data rate or low data rate signals at any time. Conventional methods of signal configuration might not be well-suited to account for the complexity of a modern or future radio environment.

As used herein, the term "radio environment", or simply "environment", refers to a general surrounding where a number of UEs are connected to one or more base stations. An environment could be variable and changing. Some changes in an environment could be considered to be long-term changes, and occur over minutes, hours or days. Long-term changes could also be large-scale and occur over relatively large areas. Long-term changes could be due to temperature, weather, traffic density, date, season, terrain, and/or implementation technology (including both radio frequency (RF) and digital signal processing technology). Long-term and/or large-scale environmental changes could originate from outside global changes, including varying densities of user subscribers, varying traffic-loads and changes to a global scheduling strategy, for example. These changes could affect every UE in the region. For example, if there are less active UEs in the nighttime compared to the daytime, UEs might be subject to less interference during the nighttime. In another example, if any or all base stations in a region were upgraded to more complex receiver algorithms (for example, a Turbo receiver) that resulted in about a 1 dB coding gain, the coverage area could be enlarged and the long-term and large-scale environment could be changed.

Some changes in an environment could be considered to be middle-term changes, and occur over seconds or minutes. Middle-term changes could also be middle-scale and occur over smaller areas than large-scale changes, for example. Middle-term changes could be due to penetration shadowing, slow fading, changing terrain and/or moving trajectories of a UE, and could be predictable in some cases. For example, the moving trajectory of a vehicular user might follow a street (i.e., a predictable direction) at a predictable speed. In another example, if a number of users are gathering at a coffee shop, the density of UEs, and therefore the potential interference, could be predicted based on the number of users.

Some changes could be considered to be short-term changes, and over microseconds or milliseconds. Short-term changes could also be small-scale and occur over relatively small areas. Short-term and/or small-scale environmental changes could be nearly random variables. To compensate for short-term and/or small-scale changes, a transmitter could encode a number of reference signals (for example, demodulation reference signals (DMRSs), pilot signals, signal preambles and/or training sequences) that are known to receivers. A receiver could then use these reference signals to estimate stochastic changes (for example, distortion), and then compensate them (for example, using equalization). In the case that a large number of UEs are active in a communication network, reference signal resources, such as DMRS resources, could be limited. As such, there is a desire to find an efficient use of available reference signal resources. Short-term and/or small-scale environmental changes could include some stable and/or predictable statistical properties such as expectation and variance. Therefore, the design of the reference signals (for example, the density, length, duration and/or power-offset of the reference signals) could be based on statistical properties, rather than randomness. For example, if frequency-selectivity, which could be a statistical property, is predicted to be high, a transmitter could use more DMRSs in the frequency dimension. In another example, if coherence time, which could also be a statistical property, is predicted to be long for a certain period of time, a transmitter could use less DMRSs in the time dimension.

Some aspects of the present disclosure relate to the development and use of a radio environment global knowledge center, which is also referred to herein as "a knowledge center", for a wireless network. The knowledge center stores environmental knowledge for a service region of the wireless network. For example, the knowledge center could record, track and even predict changes to the environment that are relevant to wireless communications. In some embodiments, a service region includes multiple cells, multiple base stations and/or multiple active UEs. The knowledge center collects real-time measurement data from any or all base stations and active UEs in the service region.

In some embodiments, the knowledge center is used to help generate signal designs or configurations for any or all active UEs in the region. A signal configuration could be based on a prediction of signal-to-interference ratio (SINR), shadowing factors, fading factors, latency, throughput, and/or implementation costs by the knowledge center, for example. To be timely and global, the knowledge center collects and stores information from all UEs that are associated with the knowledge center. As such, measurements from one UE could become knowledge that is used by multiple UEs. In some implementations, increasing the number of environmental changes that are reflected in the knowledge center could improve the success of signal configurations generated by the knowledge center.

A knowledge center is used to balance the needs of multiple UEs in a service region. In some cases, the knowledge center functions as a scheduler. For example, the knowledge center could generate a signal configuration for multiple UEs, where each signal configuration is generated in order to balance the needs or requirements of all active UEs that are serviced by the knowledge center. In contrast, if a large number of UEs obtained information from a knowledge center, and each UE used the knowledge center to improve its own signal configuration, the combined effort of all of these UEs could result in undesirable changes in the environment. Therefore, in some cases, a global optimal strategy might not be one in which each UE seeks its own best interest.

In some embodiments, a knowledge center is not directly used to generate signal configurations, but is instead used help build multiple UE agents that generate signal configurations for respective UEs. A UE agent could be created when a UE is scheduled a higher layer or task job. Non-limiting examples of higher layer jobs include uplink (UL) and downlink (DL) communications between the UE and a base station, and sidelink (SL) communications between the UE and another UE. After the UE agent is created, the UE agent would make use of the knowledge center to produce efficient signal configurations for the UE based on emulated results of how these signal configurations potentially meet the requirements of the higher layer job, and match the state of the UE and the state of the environment, for example.

In some embodiments, artificially intelligent neural network (NN) technology is used to help provide a knowledge center and UE agents. Artificial intelligence (AI) is an emerging and fast-growing field thanks to the advances made in the field of computer architecture and in particular: general purpose graphics processing units (GP-GPUs). As an example: deep convolutional neural networks have gained a lot of attention thanks to their ability to find patterns in data with intrinsic structure through the use of convolutional filters. The application of artificial intelligence to the field of communications is largely unexplored and may help outperform existing solutions or help reshape wireless networks conceptually. Artificially intelligent neural network (NN) technology could be used to help generate improved signal configurations. Accordingly, the use of a neural network could improve the operation of a wireless system.

Some embodiments of the present disclosure provide a knowledge center and UE agent that are implemented using NN technology. The knowledge center includes a database that collects and stores multiple data samples, where each data sample includes information that is associated with a respective transmission in a physical environment. Non-limiting examples of transmissions in the physical environment include UL and DL transmissions between UEs and base stations, and SL transmissions between UEs. Using the data samples, a NN in the knowledge center is periodically trained. Following the training, the NN in the knowledge center could be considered to be an emulated environment that reflects the physical environment. The NN in the knowledge center can simulate transmissions in this emulated environment to predict the result of these transmissions in the physical environment. The simulation of transmissions is used to configure the UE agent. The UE agent includes a generator NN that generates a candidate signal configuration for a scheduled transmission in the physical environment. The scheduled transmission could be part of a higher layer job, for example. However, the UE agent might not know how effective this candidate signal configuration will be in the physical environment. As such, the UE agent could use the trained NN in the knowledge center to evaluate or emulate the candidate signal configuration for the physical or "true" environment. If the evaluation indicates that the candidate signal configuration is suitable and has a long-term positive reward for the physical environment, the candidate signal configuration becomes a final signal configuration. The UE agent then sends the final signal configuration to the UE or to a base station, depending on if the transmission is a UL, DL or SL transmission, to configure the scheduled transmission. In other words, the final signal configuration is executed in a true environment. Alternatively, if the evaluation of the signal configuration indicates that the candidate signal configuration is not suitable for the physical environment, the UE agent could use the evaluation results as a sample with which to train the generator NN to produce improved candidate signal configurations for the physical environment. Once a generator NN is trained, the generator NN might not be retrained until a predefined amount of time has passed, or until the effectiveness of the signal configurations generated by the generator NN drops below a predefined threshold. The NN in the knowledge center can be regarded as an emulator of the true environment. Any potential signal configuration from a generator NN of a UE agent could be tested in this emulated environment before being executed in the true environment.

FIGS. 1A-1D illustrate examples of networks and devices that could implement any or all aspects of the present disclosure.

FIG. 1A is a block diagram illustrating an example communication system 1400 in which embodiments of the present disclosure could be implemented. In general, the communication system 1400 enables multiple wireless or wired elements to communicate data and other content. The purpose of the communication system 1400 may be to provide content (voice, data, video, text) via broadcast, narrowcast, user device to user device, etc. The communication system 1400 may operate by sharing resources such as bandwidth.

In this example, the communication system 1400 includes electronic devices (ED) 1410a-1410c, radio access networks (RANs) 1420a-1420b, a core network 1430, a public switched telephone network (PSTN) 1440, the internet 1450, and other networks 1460. Although certain numbers of these components or elements are shown in FIG. 14, any reasonable number of these components or elements may be included in the communication system 1400.

The EDs 1410a-1410c and RANs 1420a-1420b operate within a radio environment 1494. Details regarding radio environments are provided elsewhere herein.

The EDs 1410a-1410c are configured to operate, communicate, or both, in the communication system 1400. For example, the EDs 1410a-1410c are configured to transmit, receive, or both via wireless or wired communication channels. Each ED 1410a-1410c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1A, the RANs 1420a-1420b include base stations 1470a-1470b, respectively. Each base station 1470a-1470b is configured to wirelessly interface with one or more of the EDs 1410a-1410c to enable access to any other base station 1470a-1470b, the core network 1430, the PSTN 1440, the internet 1450, and/or the other networks 1460. For example, the base stations 1470a-1470b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 1410a-1410c may be alternatively or additionally configured to interface, access, or communicate with any other base station 1470a-1470b, the internet 1450, the core network 1430, the PSTN 1440, the other networks 1460, or any combination of the preceding. The communication system 1400 may include RANs, such as RAN 1420b, wherein the corresponding base station 1470b accesses the core network 1430 via the internet 1450, as shown.

The EDs 1410a-1410c and base stations 1470a-1470b are examples of communication equipment or network devices that can be configured to implement some or all of the functionality and/or embodiments described herein. In the embodiment shown in FIG. 1A, the base station 1470a forms part of the RAN 1420a, which may include other base stations, base station controller(s) (BSC), radio network controller(s) (RNC), relay nodes, elements, and/or devices. Any base station 1470a, 1470b may be a single element, as shown, or multiple elements, distributed in the corresponding RAN, or otherwise. Also, the base station 1470b forms part of the RAN 1420b, which may include other base stations, elements, and/or devices. Each base station 1470a-1470b transmits and/or receives wireless signals within a particular geographic region or area, sometimes referred to as a "cell", "service region" or "coverage area". A cell may be further divided into cell sectors, and a base station 1470a-1470b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 1420a-1420b shown is exemplary only. Any number of RAN may be contemplated when devising the communication system 1400.

The base stations 1470a-1470b communicate with one or more of the EDs 1410a-1410c over one or more air interfaces 1490 using wireless communication links, e.g. radio frequency (RF), microwave, infrared (IR), etc. The air interfaces 1490 may utilize any suitable radio access technology. For example, the communication system 1400 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 1490.

A base station 1470a-1470b may implement Universal Mobile Telecommunication System (UMTS) Terrestrial Radio Access (UTRA) to establish an air interface 1490 using wideband CDMA (WCDMA). In doing so, the base station 1470a-1470b may implement protocols such as HSPA, HSPA+ optionally including HSDPA, HSUPA or both. Alternatively, a base station 1470a-1470b may establish an air interface 1490 with Evolved UTMS Terrestrial Radio Access (E-UTRA) using LTE, LTE-A, and/or LTE-B. It is contemplated that the communication system 1400 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 1420a-1420b are in communication with the core network 1430 to provide the EDs 1410a-1410c with various services such as voice, data, and other services. The RANs 1420a-1420b and/or the core network 1430 may be in direct or indirect communication with one or more other RANs (not shown), which may or may not be directly served by core network 1430, and may or may not employ the same radio access technology as RAN 1420a, RAN 1420b or both. The core network 1430 may also serve as a gateway access between (i) the RANs 1420a-1420b or EDs 1410a-1410c or both, and (ii) other networks (such as the PSTN 1440, the internet 1450, and the other networks 1460). In addition, some or all of the EDs 1410a-1410c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 1450. PSTN 1440 may include circuit switched telephone networks for providing plain old telephone service (POTS). Internet 1450 may include a network of computers and subnets (intranets) or both, and incorporate protocols, such as IP, TCP, UDP. EDs 1410a-1410c may be multimode devices capable of operation according to multiple radio access technologies, and incorporate multiple transceivers necessary to support such.

The EDs 1410a-1410c communicate with one another over one or more sidelink (SL) air interfaces 1480 using wireless communication links, e.g. radio frequency (RF), microwave, infrared (IR), etc. The SL air interfaces 1480 may utilize any suitable radio access technology, and may be substantially similar to the air interfaces 1490 over which the EDs 1410a-1410c are in communication with one or more of the base stations 1470a-1470b, or they may be substantially different. For example, the communication system 1400 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 1480. In some embodiments, the SL air interfaces 1480 may be, at least in part, implemented over unlicensed spectrum.

The base station 1470a includes a knowledge center 1491, which stores data and knowledge associated with the radio environment 1494. Data is reported to the knowledge center 1491 from any or all active network devices that are receiving and/or transmitting in the radio environment 1494. For example, the knowledge center 1491 can receive measurements from the EDs 1410a-1410c and/or the base stations 1470a-1470b. At least some of these measurements characterize transmissions performed over the air interfaces 1490 and/or over the SL air interfaces 1480. The knowledge center 1491 services the entire radio environment 1494, and therefore there might not be a need for another knowledge center to be implemented within the radio environment. For example, base station 1470b does not include a knowledge center. However, in other embodiments, knowledge centers are implemented at multiple base stations (or even every base station) in a radio environment.

The base station 1470a includes one or more UE agent(s) 1492a, and the base station 1470b includes one or more UE agent(s) 1492b. At least some of the UE agents 1492a-1492b are associated with the EDs 1410a-1410c, and are used to generate signal configurations for these EDs. For example, the UE agent(s) 1492a can generate signal configurations that are used by the base station 1470a for transmissions to the ED 1410b. The UE agent(s) 1492a can also generate signal configurations that are sent to the ED 1410b, and used for transmissions from the ED 1410b to the base stations 1470a-1470b and/or to the EDs 1410a, 1410c. The UE agents 1492a-1492b are in communication with the knowledge center 1491, and as such the knowledge center can configure or train the UE agents to produce more efficient signal configurations, as discussed elsewhere herein. The UE agent(s) 1492b are in communication with the knowledge center 1491 via the core network 1430.

It should be understood that the knowledge center 1491 and/or the UE agents 1492a-1492b might not be distinct components of the base stations 1470a-1470b, but could instead be implemented within the existing computing systems and/or devices in the base stations.

The implementation of the knowledge center 1491 and the UE agents 1492a-1492b shown in FIG. 1A is an example. Other implementations of knowledge center(s) and UE agent(s) are also contemplated. In some embodiments, knowledge center(s) and UE agent(s) are implemented at one or more remote data centers that are accessed by one or more base stations. In some embodiments, knowledge center(s) and/or UE agent(s) are implemented at the core network side (for example, the core network 1430). When a knowledge center is implemented at the core network side, it may service larger regions and/or more UEs than a knowledge center implemented at a base station, for example.

In some embodiments, a knowledge center is only associated with a single cell in a network. For example, in the case of a standalone small cell for a factory or a school, a knowledge center could be implemented to service this small cell.

Figure 1B:
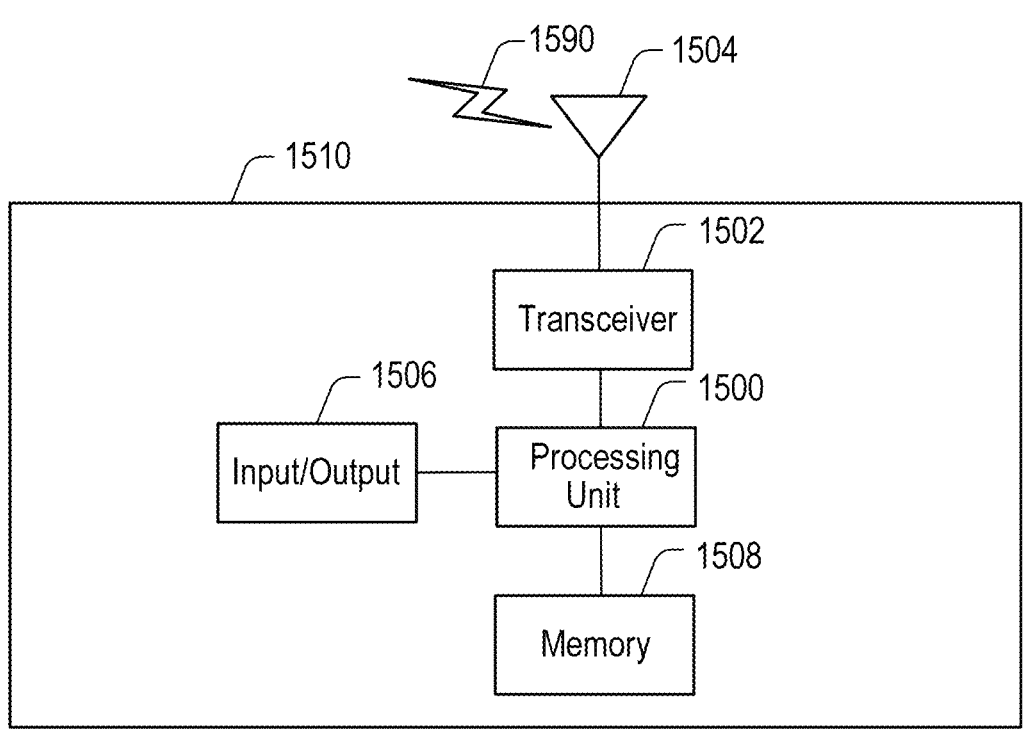
FIGS. 1B and 1C are block diagrams illustrating example devices that may implement the methods and teachings according to this disclosure.
Figure 1C:
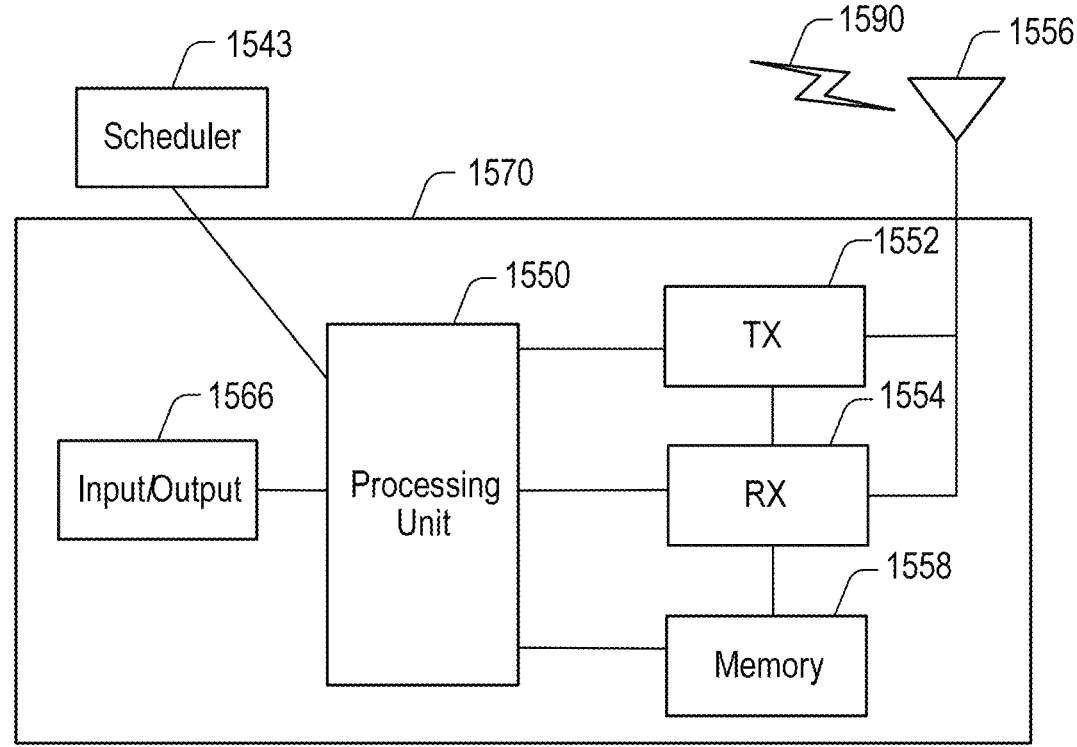

FIGS. 1B and 1C illustrate example devices that may implement the methods and teachings according to this disclosure. In particular, FIG. 1B illustrates an example ED 1510, and FIG. 1C illustrates an example base station 1570. These components could be used in the communication system 1400 of FIG. 1A, or in any other suitable system.

As shown in FIG. 1B, the ED 1510 includes at least one processing unit 1500. The processing unit 1500 implements various processing operations of the ED 1510. For example, the processing unit 1500 could perform signal coding, data processing, power control, input/output processing, or any other functionality enabling the ED 1510 to operate in the communication system 1400. The processing unit 1500 may also be configured to implement some of the functionality and/or embodiments described elsewhere herein. Each processing unit 1500 includes any suitable processing or computing device configured to perform one or more operations. Each processing unit 1500 could, for example, include a microprocessor, microcontroller, digital signal processor, field programmable gate array, or application specific integrated circuit.

The ED 1510 also includes at least one transceiver 1502. The transceiver 1502 is configured to modulate data or other content for transmission by at least one antenna or Network Interface Controller (NIC) 1504. The transceiver 1502 is also configured to demodulate data or other content received by the at least one antenna 1504. Each transceiver 1502 includes any suitable structure for generating signals for wireless or wired transmission and/or processing signals received wirelessly or by wire. Each antenna 1504 includes any suitable structure for transmitting and/or receiving wireless or wired signals. One or multiple transceivers 1502 could be used in the ED 1510. One or multiple antennas 1504 could be used in the ED 1510. Although shown as a single functional unit, a transceiver 1502 could also be implemented using at least one transmitter and at least one separate receiver.

The ED 1510 further includes one or more input/output devices 1506 or interfaces (such as a wired interface to the internet 1450). The input/output devices 1506 permit interaction with a user or other devices in the network. Each input/output device 1406 includes any suitable structure for providing information to or receiving information from a user, such as a speaker, microphone, keypad, keyboard, display, or touch screen, including network interface communications.

In addition, the ED 1510 includes at least one memory 1508. The memory 1508 stores instructions and data used, generated, or collected by the ED 1510. For example, the memory 1508 could store software instructions or modules configured to implement some or all of the functionality and/or embodiments described elsewhere herein and that are executed by the processing unit(s) 1500. Each memory 1508 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 1C, the base station 1570 includes at least one processing unit 1550, at least one transmitter 1552, at least one receiver 1554, one or more antennas 1556, at least one memory 1558, and one or more input/output devices or interfaces 1566. A transceiver, not shown, may be used instead of the transmitter 1552 and receiver 1554. A scheduler 1553 may be coupled to the processing unit 1550. The scheduler 1553 may be included within or operated separately from the base station 1570. The processing unit 1550 implements various processing operations of the base station 1570, such as signal coding, data processing, power control, input/output processing, or any other functionality. Each processing unit 1550 includes any suitable processing or computing device configured to perform one or more operations. Each processing unit 1550 could, for example, include a microprocessor, microcontroller, digital signal processor, field programmable gate array, or application specific integrated circuit.

The processing unit 1550 can be configured to implement some or all of the functionality of a knowledge center and/or one or more UE agent(s), such as the knowledge center 1491 and UE agent(s) 1492a-1492b of FIG. 1A, for example. Alternatively, a knowledge center and/or UE agent(s) could be implemented on designated processing units that do not implement other operations of the base station 1570.

Each transmitter 1552 includes any suitable structure for generating signals for wireless or wired transmission to one or more EDs or other devices. Each receiver 1554 includes any suitable structure for processing signals received wirelessly or by wire from one or more EDs or other devices. Although shown as separate components, at least one transmitter 1552 and at least one receiver 1554 could be combined into a transceiver. Each antenna 1556 includes any suitable structure for transmitting and/or receiving wireless or wired signals. Although a common antenna 1556 is shown here as being coupled to both the transmitter 1552 and the receiver 1554, one or more antennas 1556 could be coupled to the transmitter(s) 1552, and one or more separate antennas 1556 could be coupled to the receiver(s) 1554. Each memory 1558 includes any suitable volatile and/or non-volatile storage and retrieval device(s) such as those described above in connection to the ED 1510. The memory 1558 stores instructions and data used, generated, or collected by the base station 1570. For example, the memory 1558 could store software instructions or modules configured to implement some or all of the functionality and/or embodiments described elsewhere herein and that are executed by the processing unit(s) 1550.

Each input/output device 1566 permits interaction with a user or other devices in the network. Each input/output device 1566 includes any suitable structure for providing information to or receiving/providing information from a user, including network interface communications.

Additional details regarding the ED 1510 and the base station 1570 are known to those of skill in the art. As such, these details are omitted here for clarity.

Figure 1D:
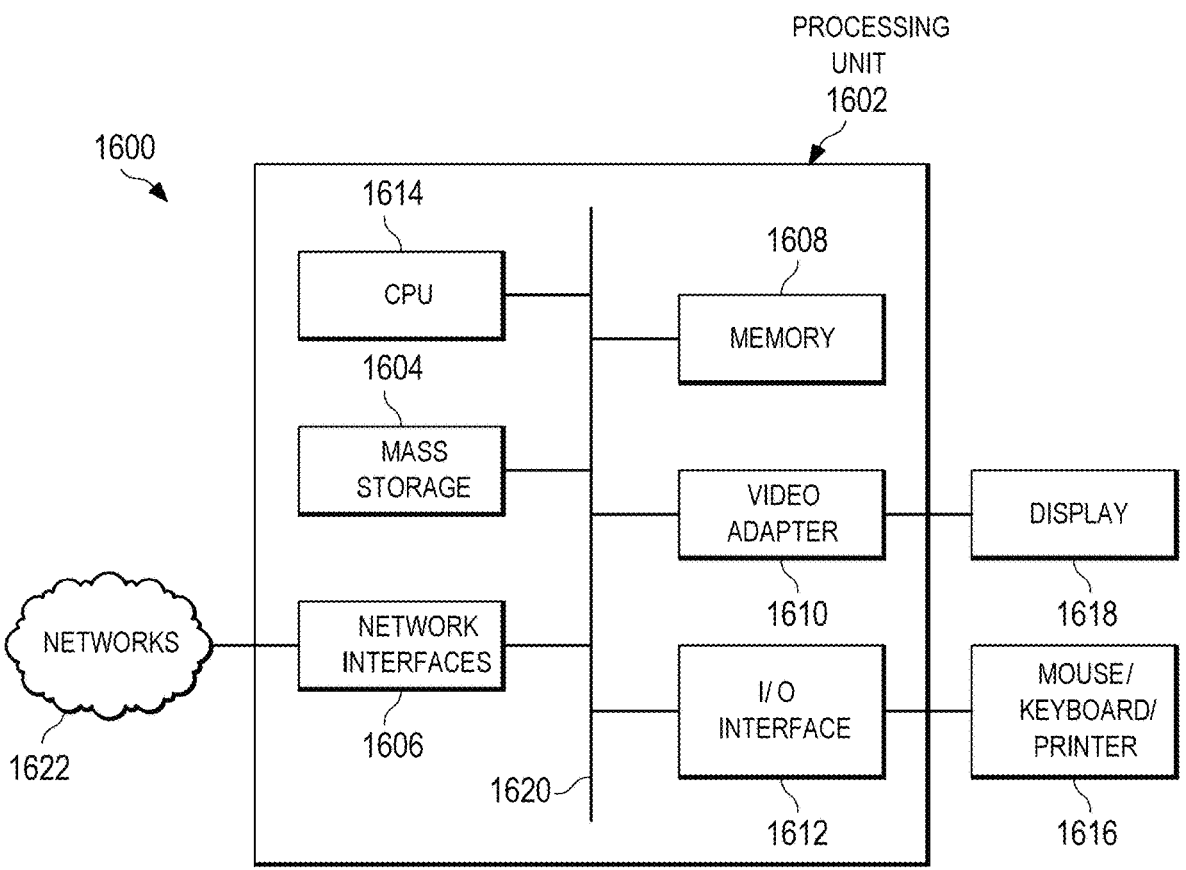
FIG. 1D is a block diagram of an example computing system that may implement the methods and teachings according to this disclosure.

FIG. 1D is a block diagram of an example computing system 1600 that may implement the methods and teachings according to this disclosure. For example, the computing system 1600 could be used for implementing any or all of the functions, neural networks (NNs) and databases described herein.

Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1600 includes a processing unit 1602. The processing unit 1602 includes a central processing unit (CPU) 1614, memory 1608, and may further include a mass storage device 1604, a video adapter 1610, and an I/O interface 1612 connected to a bus 1620.

The bus 1620 may be one or more of any type of several bus architectures including a memory bus or memory controller, a peripheral bus, or a video bus. The CPU 1614 may comprise any type of electronic data processor. The memory 1608 may comprise any type of non-transitory system memory such as static random access memory (SRAM), dynamic random access memory (DRAM), synchronous DRAM (SDRAM), read-only memory (ROM), or a combination thereof. In an embodiment, the memory 1608 may include ROM for use at boot-up, and DRAM for program and data storage for use while executing programs.

The mass storage 1604 may comprise any type of non-transitory storage device configured to store data, programs, and other information and to make the data, programs, and other information accessible via the bus 1620. The mass storage 1604 may comprise, for example, one or more of a solid state drive, hard disk drive, a magnetic disk drive, or an optical disk drive.

The video adapter 1610 and the I/O interface 1612 provide interfaces to couple external input and output devices to the processing unit 1602. As illustrated, examples of input and output devices include a display 1618 coupled to the video adapter 1610 and a mouse/keyboard/printer 1616 coupled to the I/O interface 1612. Other devices may be coupled to the processing unit 1602, and additional or fewer interface cards may be utilized. For example, a serial interface such as Universal Serial Bus (USB) (not shown) may be used to provide an interface for an external device.

The processing unit 1602 also includes one or more network interfaces 1606, which may comprise wired links, such as an Ethernet cable, and/or wireless links to access nodes or different networks. The network interfaces 1606 allow the processing unit 1602 to communicate with remote units via the networks. For example, the network interfaces 1606 may provide wireless communication via one or more transmitters/transmit antennas and one or more receivers/receive antennas. In an embodiment, the processing unit 1602 is coupled to a local-area network 1622 or a wide-area network for data processing and communications with remote devices, such as other processing units, the Internet, or remote storage facilities.

The computing system 1600 may implement, in whole or in part, artificial intelligence mechanisms (for instance: heuristics, support vector machines, artificial neural networks, convolutional neural networks, etc.). For example, one or more aspects of a knowledge center and/or a UE agent could be implemented using the processing unit 1602. According to one example, the mass storage 1602 and/or the memory 1608 could store a database including multiple data samples that each include information associated with a respective physical transmission in a radio environment, a NN associated with the radio environment, and programming for execution by the CPU 1614, where the programming includes instructions to perform actions in accordance with any method described herein. According to another example, the mass storage 1602 and/or the memory 1608 could store a NN associated with a UE and programming for execution by the CPU 1614, where the programming includes instructions to perform actions in accordance with any method described herein.

Some aspects of the present disclosure relate to the organization, classification and storage of information or knowledge for a radio environment. This knowledge could be organized using data structures for use by a knowledge center. Although traditional database technology allows for the storage of large quantities of data, this data might not equate to knowledge that can be used by a knowledge center.

In some embodiments, information regarding an environment includes global information or a global information state. Global information will be denoted as Global_state(t), where t represents a particular instance in time. Global information could include information associated with a radio environment that is common to all UEs in a service region (which may contain one or more base-stations) that is serviced by a knowledge center. Non-limiting examples of global information include temperature, weather, time of day, network traffic, season and calendar date. Global information could mainly include long-term and/or large-scale information, however this might not be the case in all embodiments. Global information could also or instead include medium-term, medium-scale, short-term and/or small-scale information. In some embodiments, global information might be measured or determined relatively easily, or be provided by external sources or methods.

In some embodiments, information regarding an environment includes UE-specific information and/or UE state information, which will be denoted as UE_state(x;t), where x is a unique index or identifier for a UE, and t is time. A UE with an index x will be denoted as UE-(x). In some embodiments, UE state information is only relevant to one UE. UE state information could mainly include middle-term and/or medium-scale information, but this might not be the case in all embodiments. UE state information could include both variable and invariable information, which are each represented by a respective UE_state(x;t) vector. Invariable UE information includes a higher layer job description and UE-specific requests. Non-limiting examples of UE-specific requests include peak-to-average power ratio (PAPR) constraints, quality of service (QoS) constraints, power constraints, code rate, latency, bandwidth, UE category, UE capability, and throughput (T/P). Variable UE information includes information related to a UE changing state. Non-limiting examples of variable UE state information include achieved T/P, achieved PAPR, transmit power achieved, transmit antenna achieved, geographic position, measurement results (for example, reference signal measurement results) and achieved status (for example, the bits a UE is scheduled to transmit and the remaining time that the UE has to transmit them). UE state information could be predicted and/or tracked in a knowledge center.

Figure 2A:
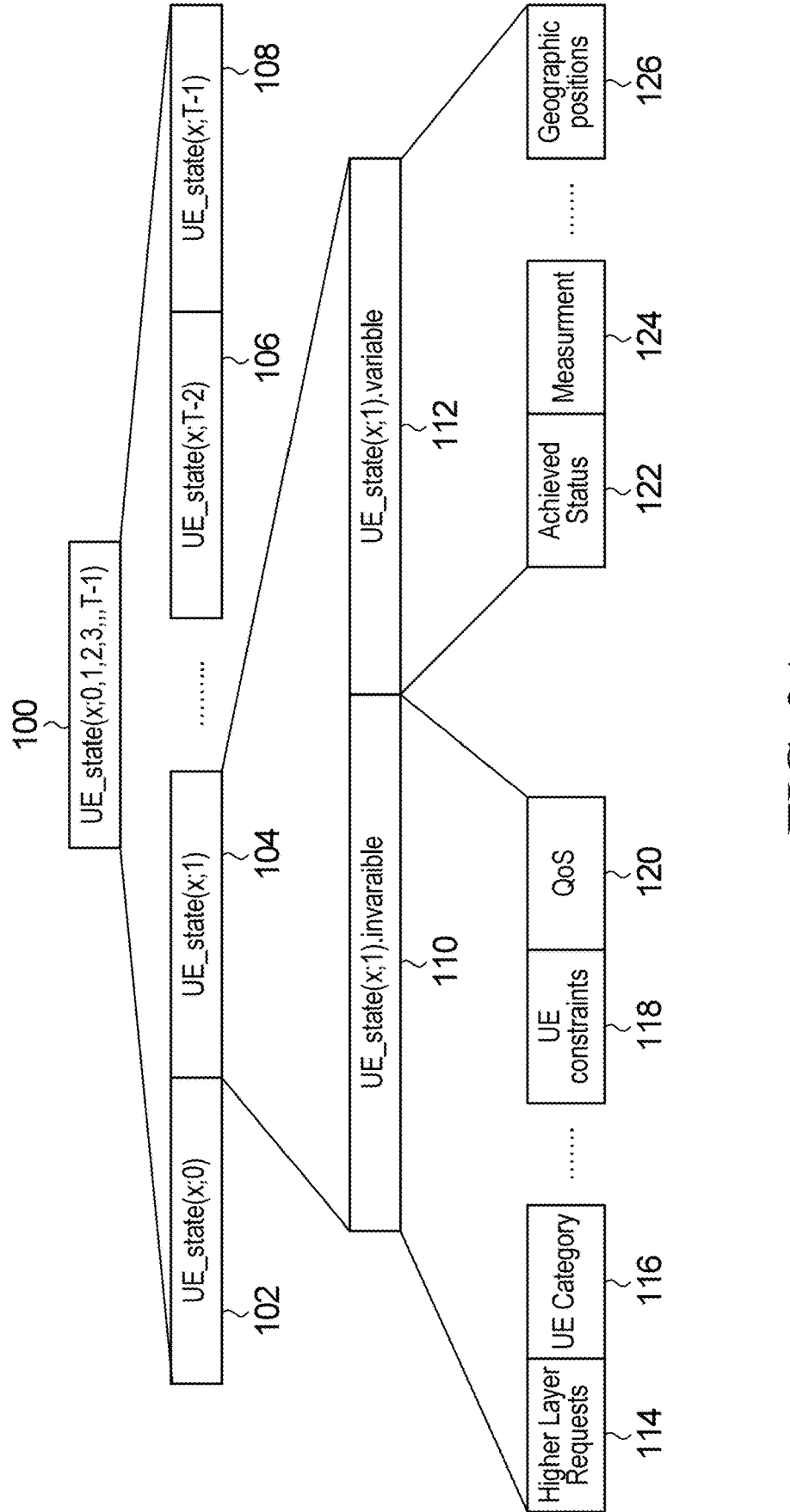
FIG. 2A is a block diagram illustrating an example data structure for UE state information.

FIG. 2A is a block diagram illustrating an example data structure for UE state information. FIG. 2A includes UE_state(x; 0, 1, 2, 3 . . . T−1) 100, which is a vector containing UE state information for time periods 0, 1, 2, . . . , T−1, where T is an integer. Vector 100 includes UE_state(x;0) 102, UE_state(x;1) 104, . . . , UE_state(x;T−2) 106 and UE_state(x;T−1) 108, which are vectors that each include UE state information at a particular instance in time. A detailed example of the contents of one of the UE_state vectors is shown for UE_state(x;1) 104. As illustrated by in FIG. 2A, vector 104 contains UE_state(x;1).invariable 110 and UE_state(x;1).variable 112. Although not shown in FIG. 2A, the other vectors 102, 106, 108 also contain variable and invariable information. UE_state(x;1).invariable 110 contains the invariable information for vector 104. In the illustrated example, this includes higher layer requests 114, UE category 116, UE constraints 118, and QoS 120. UE_state(x;1).variable 112 contains the variable information for vector 104. In the illustrated example, this includes achieved status 122, measurements 124, and geographic positions 126. Vectors 110, 112 could also contain other information that is not illustrated in FIG. 2A.

Using global information and UE state information, a knowledge center can evaluate or score a signal configuration for a UE. The signal configuration could be used to complete a higher layer job or task. In some embodiments, the design or configuration of a signal for UE-(x) at a time instance t is interpreted as a UE action, which will be denoted as UE_action(x;t). A UE action defines a set transmission parameters that could be used for a physical transmission in a network. The determination of a UE action could reflect the statistical properties of short-term and/or small-scale random variables. In some implementations, a UE action is a multi-dimensional "image" defined by a wireless standard, where each axis of the image represents a design or configuration dimension for the signal. Non-limiting examples of design dimensions include fast Fourier transform (FFT) size, discrete Fourier transform (DFT) size, resource elements (REs) along the frequency domain, REs along the time domain, pre-coding coefficients, adaptive modulation coding (AMC) range, time advance, power offset and multiple-input multiple-output (MIMO) weights. A design dimension could include a finite number of possible values. For example, along the AMC dimension, there may be a finite number of the AMC points. In another example, along the FFT dimension, there may a limited number of allowed FFT sizes. Alternatively, a design dimension could have a continuous or infinite number of possible values.

Figure 2B:
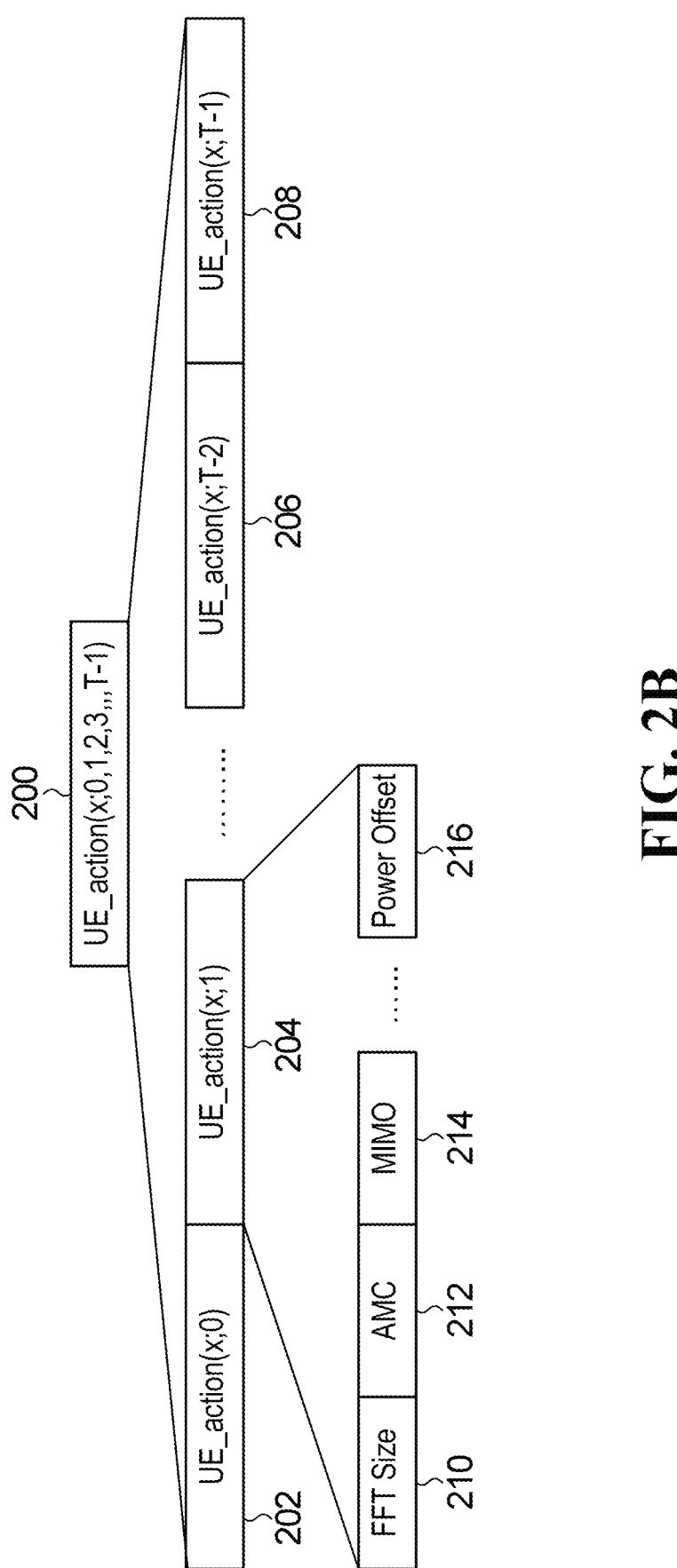
FIG. 2B is a block diagram illustrating an example data structure for a UE action.

FIG. 2B is a block diagram illustrating an example data structure for a UE action. FIG. 2B includes UE_action(x;0, 1, 2, 3 . . . T−1) 200, which is a vector representing a series of actions for UE-(x) at times 0, 1, 2, . . . , T−1. Vector 200 includes UE_action(x;0) 202, UE_action(x;1) 204, . . . , UE_action(x;T−2) 206, and UE_action(x;T−1) 208, each of which is vector representing the configuration of a signal for UE-(x) at a particular moment in time. Multiple design dimensions for vector 204 are shown by way of example, and include FFT size 210, AMC 212, MIMO 214 and power offset 216. Vector 204 could contain other design dimensions that are not illustrated in FIG. 2B. The other vectors 202, 206, 208 could also include design dimensions that are similar to those of vector 204.

UE actions are not limited to transmissions from UEs. In general, UE actions could relate to any signal transmitted over a wireless channel in a network. For example, a UE action could define a transmission from a base station or other network device to a UE.

When UE-(x) is scheduled to transmit data (i.e., a job), UE_action(x;1, 2, 3, . . . ) could be configured by the network. The data is then transmitted over a wireless channel using the signal configuration in UE_action(x;1, 2, 3, . . . ). This transmission could be interpreted as UE_action (x;1, 2, 3, . . . ) interacting with the true or physical environment. In some embodiments, each transmission results in the generation of a metric, score, loss or reward that represents the effectiveness of the UE action in the environment. A reward for a UE action will be denoted as UE_reward(x;t). In other words, the metric or score for UE_action(x;t) is UE_reward(x;t). Each transmission could also result in a change in UE state, from UE_state(x;t) to UE_state(x;t+1). UE-(x) could measure the transition from <UE_state(x;t), UE_action(x;t)> to <UE_reward(x;t), UE_state(x;t+1)> in the environment, and send these measurements to a knowledge center. Each UE transition represents an experience in the physical environment that could be used by the knowledge center to improve further signal configurations. The UE transitions could be stored at the knowledge center and extrapolated or predicted, at least to some extent, to/for all UEs in a service region.

The generation of a UE reward could be based on any of a number of different measurements and parameters associated with a physical transmission to or from a UE. These measurements and parameters could be, at least in part, reported by a UE to the network in a measurement report. The measurement report contains raw knowledge that can be used to generate a UE reward. A measurement report could include block error rate (BLER), T/P, latency, receiving power, channel quality indicator (CQI) and number of negative acknowledgements (NACKs), for example. UE_RewardMeasurement(t) is a vector that represents a measurement report generated by a UE following a UE_action(t).

In some embodiments, a UE reward is calculated from a weighted sum of multiple measurements. The weight associated with each measurement could be determined according to a network-level optimization strategy. In other words, some measurements might be considered more important than others for determining a UE reward value. For example, UE_RewardMeasurment(t) could contain two measurements: $R_1$ which represents a measured PAPR, and $R_2$ which represents a measured BLER. A system assigns weights to each of these measurements based on their relative importance, for example. These weights will be denoted in this example as $\beta_1$ and $\beta_2$, where $\beta_1=20\%$ and $\beta_2=80\%$. The system could then calculate UE_reward(t)=[(R_1*$\beta_1$)+ (R_2*$\beta_2$)]. In this example, the system considers BLER to be four times more important than PAPR. The weights can be adjusted at any time. For example, the weights can be adjusted during the running time of a UE agent and/or a knowledge center.

Other factors could also be considered in the generation of a UE reward. In some embodiments, a UE reward is based, at least in part, on the processing complexity and/or power consumption of a receiver. For example, some algorithms, such as a Turbo receiver, consume more power and increase latency, but also improve the BLER compared to other algorithms.

Figure 3:
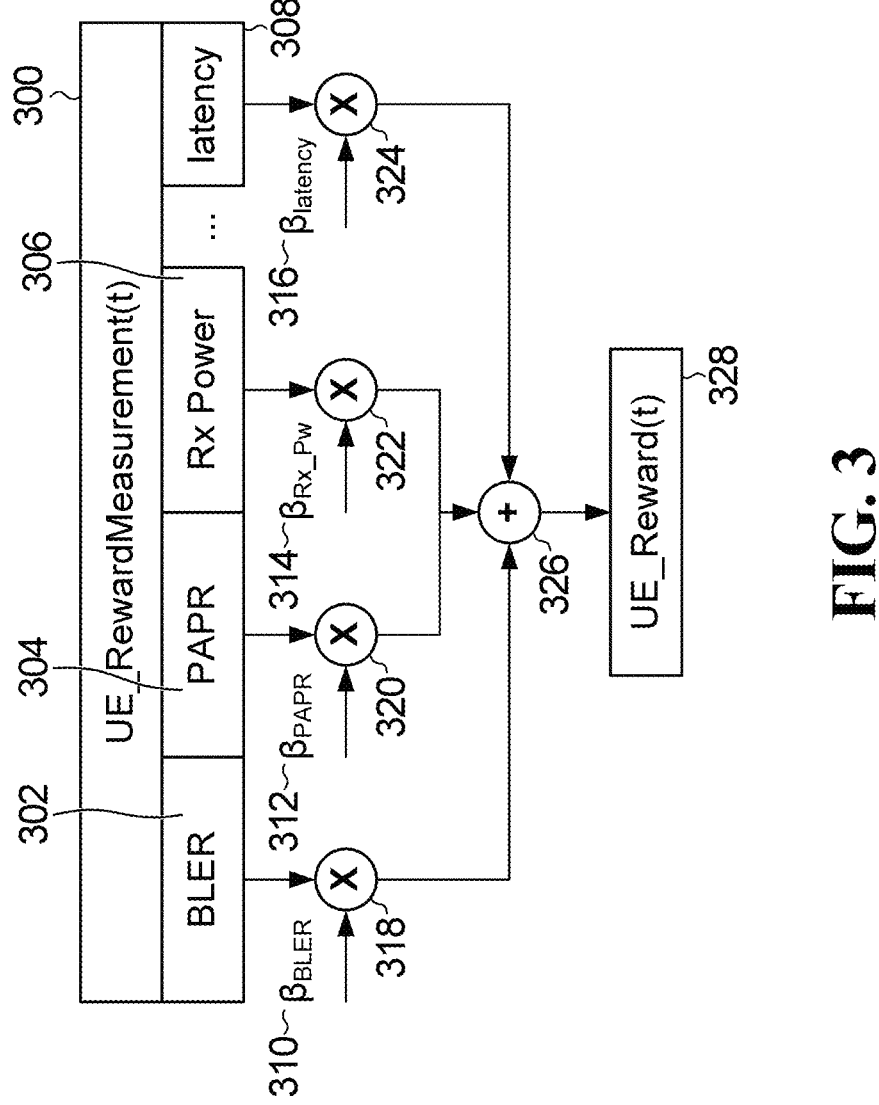
FIG. 3 is a block diagram illustrating an example data structure for the generation of a UE reward.

FIG. 3 is a block diagram illustrating an example data structure for the generation of a UE reward. FIG. 3 includes UE_RewardMeasurment(t) 300, which is a vector containing several measurements including BLER 302, PAPR 304, received power 306 and latency 308. Vector 300 could also contain other measurements not shown in FIG. 3. To calculate the UE reward, measurements 302, 304, 306, 308 are input into respective multiplication operations 318, 320, 322, 324. Operations 318, 320, 322, 324 scale measurements 302, 304, 306, 308 by a respective weight value. These weight values are denoted as $\beta_{BLER}$ 310, $\beta_{PAPR}$ 312, $\beta_{Rx\_Pw}$ 314 and $\beta_{latency}$ 316, and are also input into operations 318, 320, 322, 324, respectively. By way of example, at operation 318, measurement 302 is multiplied by weight value 310 to produce a weighted measurement for BLER. Similar processes occur at the other operations 320, 322, 324. The weighted measurements produced at operations 318, 320, 322, 324 are input into summing operation 326, which sums the weighted measurements to produce UE_reward(t) 328. The generation of the UE reward illustrated in FIG. 3 could be performed at a knowledge center, for example.

Global information, UE state information, UE actions, UE measurement reports and/or UE rewards could be stored in a database or queue within a knowledge center. In some embodiments, these vectors or variables are formatted as data or transition samples, which organize the information and measurements associated with a UE transitioning from one state to another state as the result of transmission. A data sample includes an input "image" and an output "image". An input image is the information that the network might know about a UE, and could include Global_state(t), UE_state(t) and UE_action(t), for example. The output image is the information measured or estimated by a physical layer receiver of the UE, and could include UE_reward(t) and UE_state(t+1), for example. In some embodiments, samples are stored in a database as <Global_state(t), UE_state(t), UE_action(t)->UE_reward(t), UE_state(t+1).variable>. In some embodiments, samples are stored in a database as <UE_state(t), UE_action(t)->UE_RewardMeasurment(t), UE_state(t+1).variable>+<Global_state(t)>. In some embodiments, samples are stored in a database as <UE_state (t), UE_action(t)->UE_reward(t), UE_state(t+1) >. The knowledge center could use different databases for different applications. For example, uplink (UL) and downlink (DL) communications could have separate databases.

Data samples could be collected from every physical layer receiver in a service region. In the UL, the receivers are at the base station. In the DL, the receivers are at the UE side, which could feedback measurements (e.g., CQI and ACK) to the base station via the UL channels. Each active UE periodically reports data samples to the database of the knowledge center. The database could store every data sample that is reported and eliminate the older ones periodically. Although a sample is reported from a particular UE, the sample could be stored independent of that UE. For example, information that is specific to a UE, such as a UE index, might not be stored in the database. Therefore, the knowledge center could store data samples in a format that is applicable to all UEs in a service region.

Figures 4, 5:
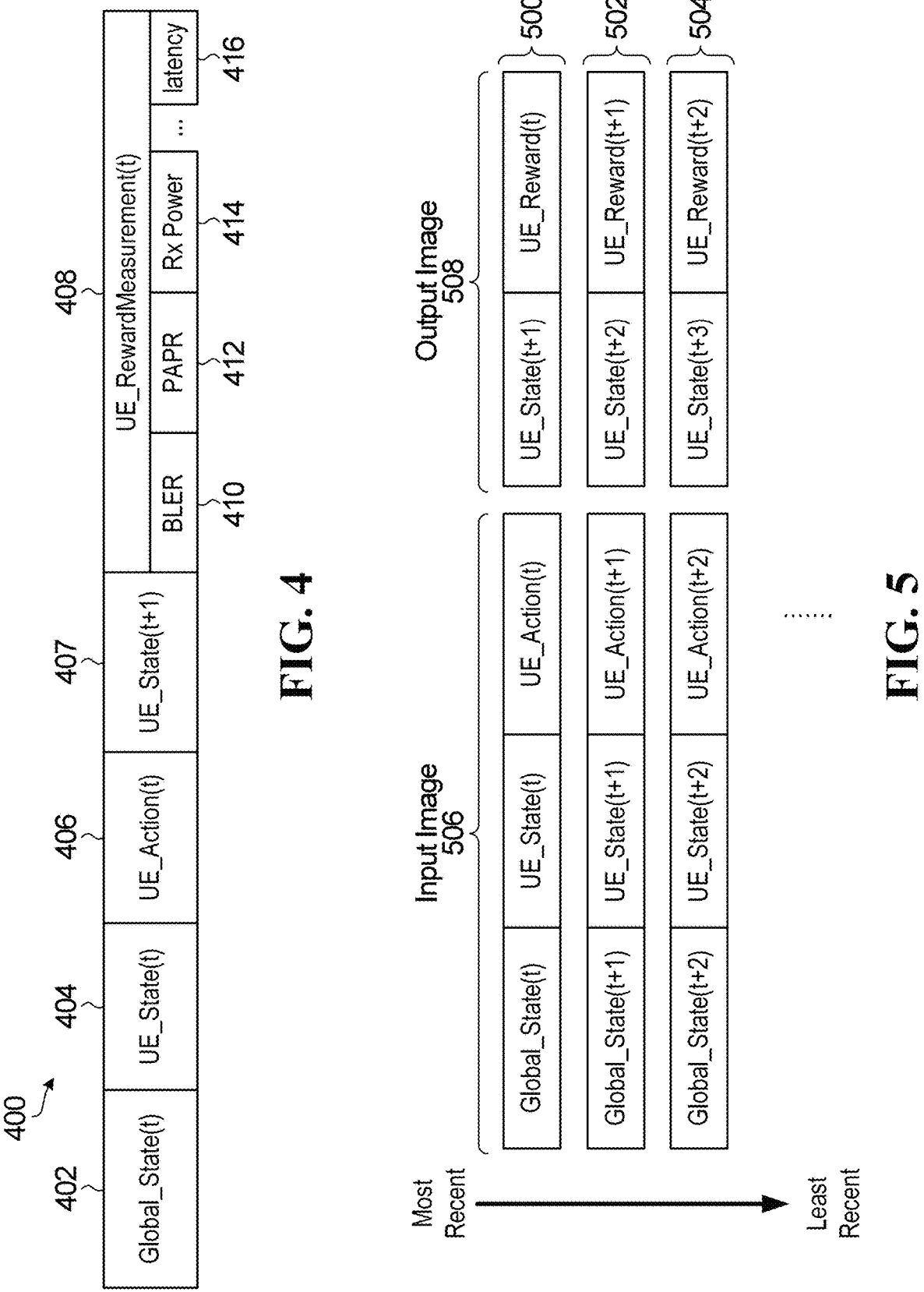
FIG. 4 is a block diagram illustrating an example data structure for a UE transition.
FIG. 5 is a block diagram illustrating an example data structure for a series of UE transitions.

FIG. 4 is a block diagram illustrating an example data structure for a UE transition. FIG. 4 includes a data sample 400, which is a vector that includes Global_state(t) 402, UE_state(t) 404, UE_action(t) 406, UE_state(t+1) 407, and UE_RewardMeasurement(t) 408. Vector 408 includes BLER 410, PAPR 412, received power 414 and latency 416, which are measurements associated with the UE transition. Other measurements could also be included in vector 408. As described above, UE_RewardMeasurement(t) 408 could be used to determine a UE reward. The UE sample could be transmitted from a UE to a knowledge center, for example.

FIG. 5 is a block diagram illustrating an example data structure for a series of UE transitions. FIG. 5 includes multiple data samples 500, 502, 504, each of which include an input image 506 and an output image 508. Data samples 500, 502, 504 are arranged from most recent to least recent, and could be stored in a database of a knowledge center.

Some aspects of the present disclosure relate to tracking on-going changes in an environment. In some embodiments, a knowledge center is configured to delete or forget older knowledge as newer knowledge becomes available. By collecting data samples from any or all physical layer receivers and periodically eliminating the older data samples, the knowledge center tracks the environmental changes in an associated service region.

A database in a knowledge center might have a limited number of data samples that can be stored at one time. As such, the database functions as a replay queue. When n new data samples enter the queue, n of the oldest data samples are deleted from the queue. In order to avoid data correlations, the elimination randomly takes n data samples from among the m oldest data samples in the queue (where m>n). For example, 80 data samples among the oldest 100 data samples in a data center could be randomly selected and deleted.

Some aspects of the present disclosure relate to extracting useful knowledge from the measured or "raw" data samples stored in a knowledge center, and using this useful knowledge for the design or configuration of signals in a communication system. If the communication system follows a wireless standard, a signal configuration could be regarded as a UE action that defines a set or combination of transmission parameters. In some embodiments, the signals are configured by a core network based on a machine learning neural network. Neural networks (NNs), and in particular deep NNs (DNNs), help organize and extract useful knowledge from the raw data samples stored in a knowledge center. This knowledge is gained by periodic training of a DNN with true data samples measured by physical layer receivers. A DNN that is implemented inside of a knowledge center is referred to herein as a knowledge DNN.

A knowledge DNN is used to estimate or predict UE state transitions for any or all active UEs in a service region. For example, if global information, UE state information and a UE action are known for a particular UE at a moment in time, a knowledge DNN can predict or estimate the UE state information and UE reward that might result from performing that UE action in the current environment. Stated differently, a knowledge DNN can help determine <Global-_state(t), UE_state(t), UE_action(t)->UE_reward(t), UE_state(t+1)>, without the UE having to physically transmit any signals. Instead, the transmission of signals is performed virtually using the knowledge DNN. By predicting UE transitions, the knowledge DNN could be regarded as an emulator or simulator of the true environment. Since the UE takes an action (UE_action(t)) in this emulated environment, the UE's state will transition from UE_state(t) to UE_state(t+1) in this emulated environment. Moreover, by estimating UE_reward(t) for UE_action(t), the knowledge DNN can estimate the effectiveness of UE_action(t) in the current environment. As such, DNNs might be an effective way to extract useful information from a knowledge center.

The DL and the UL could have respective sample databases and knowledge DNNs. These databases and knowledge DNNs could differ in how UE state information, UE actions and/or UE rewards are configured. However, databases and knowledge DNNs for both the UL and DL learn knowledge from data samples, organize the knowledge, and apply the knowledge to the design or configuration of signals. In general, the embodiments and examples provided herein apply to both the UL and DL.

A knowledge DNN will be denoted by the function K, where the estimation of a UE transition can be represented as:

$$< UE\_reward(x, t), UE\_state(x; t+1) >= \qquad \text{(Equation 1)}$$
$$K( < Global\_state(t), UE\_state(x; t), UE\_action(x; t) >, \theta_k).$$

In the equation above, $\theta_k$ denotes the weights, thresholds, biases and/or activations for each neuron in the knowledge DNN. In order for accurate estimations of UE transitions to be performed by the knowledge DNN, the values of $\theta_k$ should be determined through training. In some embodiments, machine learning is used to train a knowledge DNN. A knowledge DNNs can periodically learn from any or all data samples stored in a database of the knowledge center to update the weights of the neurons in the knowledge DNN.

Figure 6:
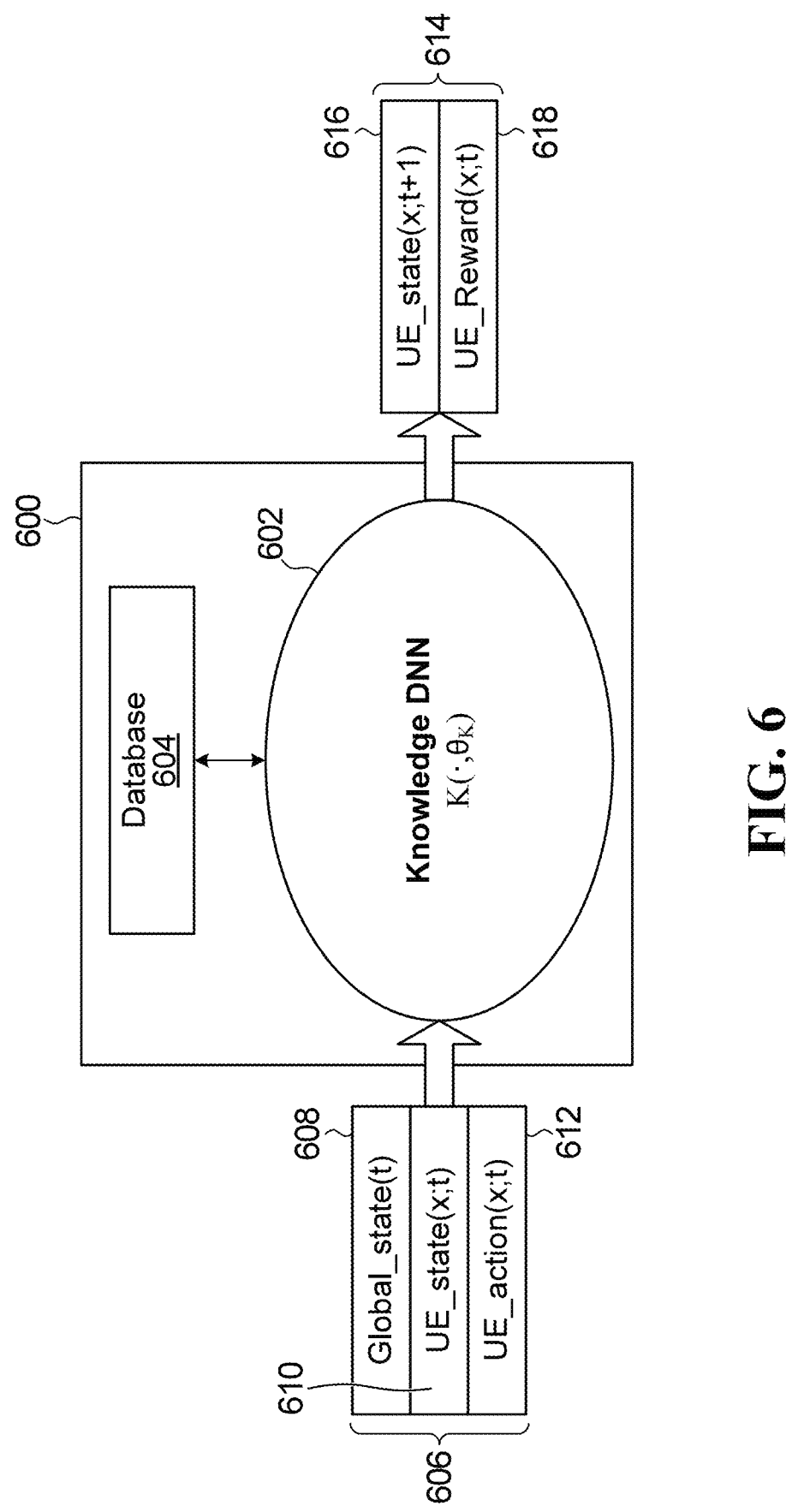
FIG. 6 is a block diagram illustrating a knowledge center according to an embodiment of the disclosure.

FIG. 6 is a block diagram illustrating a knowledge center 600 according to an embodiment. Knowledge center 600 includes a knowledge DNN 602 and a database 604. The knowledge DNN 602 and the database 604 are coupled together to allow data and information to be exchanged. For example, the knowledge DNN 602 could receive data samples stored in the database 604 for the purpose of training. The knowledge DNN 602 and/or the database 604 could be implemented as a computing system in a communication network. The knowledge DNN 602 and the database 604 could be implemented in a single computing system, or be implemented separately.

An input image 606, which includes Global_state(t) 608, UE_state(x;t) 610 and UE_action(x;t) 612, is input into the knowledge DNN 602. An output image 614, which includes UE_reward(x;t) 616 and UE_state(x;t+1) 618, is output from the knowledge DNN 602. The output image 614 could be considered a prediction generated by the DNN 602 for the input image 606.

The format of an input image and an output image for a knowledge DNN could vary for different UEs and/or for different environments. In some embodiments, the input image includes global and UE state information that is changing in the environment, and the knowledge DNN treats other information as fixed. In some embodiments, the input image only includes information that is known to be relevant for the purposes of signal configuration. For example, the input image could be configured based on the relative priority or importance of certain transmission parameters. Input image and/or output image configurations could vary based on the information considered to be relevant and/or variable for different UEs or at different times. By way of example, in the event of low SINR, a UE may choose to increase transmission power, while other UEs may choose to lower the coding rate.

A DNN includes several layers of neurons. The first layer of neurons receives the input image, and the last layer of neurons produces the output image. Each successive layer uses the output from an adjacent later as an input. The layers could form any of a number of different NN architectures. Non-limiting examples of NN architectures include convolutional NNs (CNNs), fully connective NNs, long short term memory (LSTM) networks, and recurrent NNs (RNNs). The number of the layers and the DNN architecture could vary in different implementations, and are not limited in the embodiments described herein. Changes to input and output image formats results in changes to a DNN structure. For example, if a new parameter is determined to be important for characterizing a global state, a UE state, or a UE action, this parameter could be added to an input image for a DNN. The input image would be changed to include additional dimensions to accommodate the new parameter, and the DNN architecture would also be altered accordingly. Similarly, if a new parameter is determined to be important for characterizing a UE state or UE reward, the output image could be changed to include this parameter and the DNN architecture would be altered.

Training of a DNN could include supervised learning based on a gradient ascent or gradient descent algorithm to converge towards reliable predictions or estimations for an environment. For example, gradient ascent or gradient descent back propagation could be used to reach a predetermined target for the knowledge DNN. Reaching the target includes increasing a reward and/or reducing a loss. In some embodiments, loss is defined as the cross-entropy between the output image generated by the DNN, and the measured output image stored in the database. The training could occur periodically as computational resources become available for training. If computational resources are unavailable, the network can transmit data samples to a remote data center where the training of a knowledge DNN is to be conducted. The knowledge DNN at the remote data center (for example, the updated weights and coefficients of the neurons at the remote data center) is used to update the knowledge DNN used by the network once the training is done. This is referred to as remote training. The training could also or instead occur periodically, and the period between training could be configurable.

Further details regarding NN training can be found in LeCun Y. A, et al. (2012) *Efficient BockProp.* In: Montavon G., Orr G. B, Müller K R. (eds) *Neural Networks: Tricks of the Trade. Lecture Notes in Computer Science, vol* 7700. Springer, Berlin, Heidelberg, which is incorporated by reference herein.

During DNN training, data samples in a database of the knowledge center are divided into training sample sets, verification sample sets and test sample sets. The training sample set is further divided into epochs. To help prevent data correlation, each epoch is randomly selected. For example, to generate each epoch, the DNN randomly selects training samples from the entire training sample set and then disorders the selected training samples.

Figures 7, 8A:
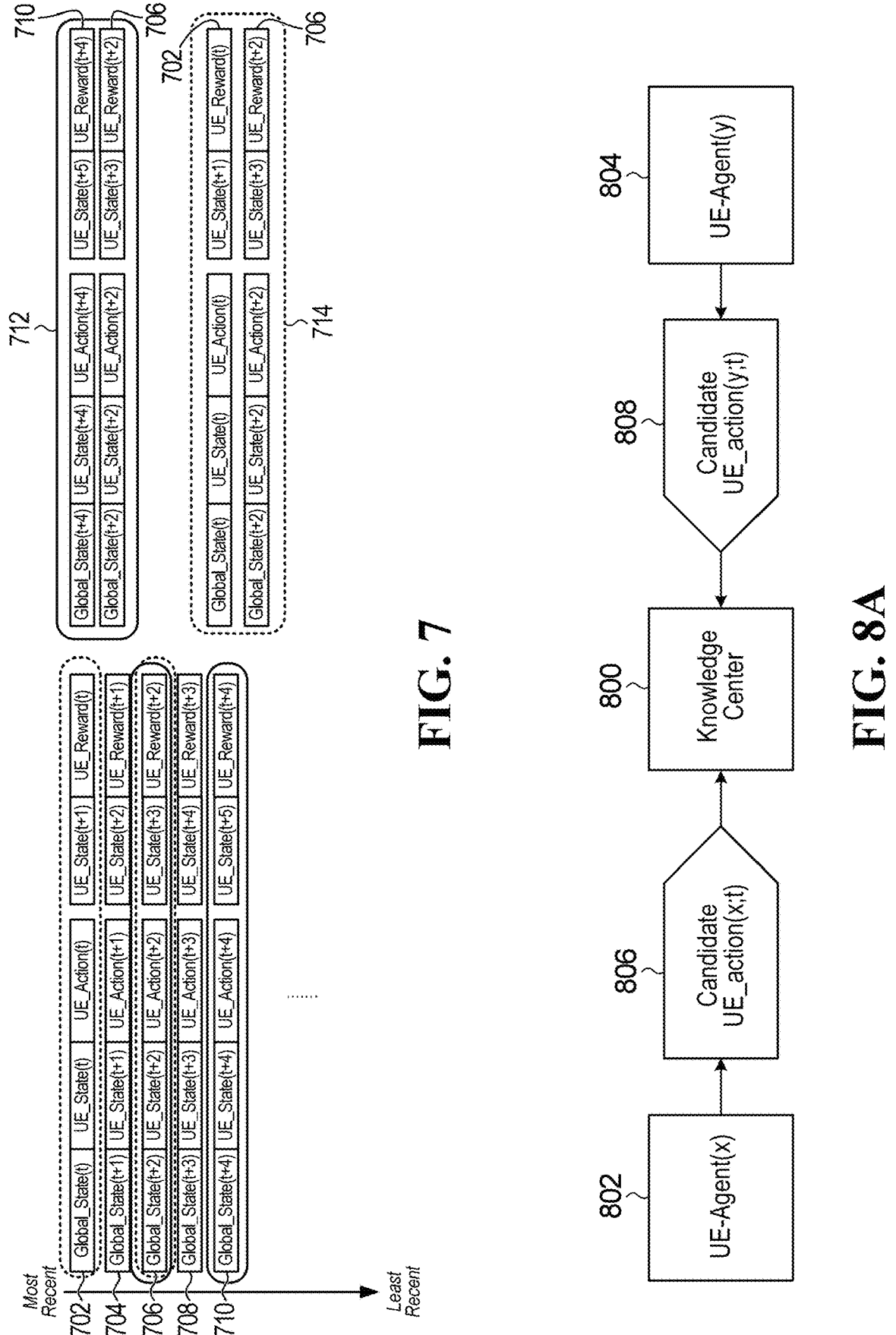
FIG. 7 is a block diagram illustrating epochs generated from a series of data samples, according to an embodiment of the disclosure.
FIGS. 8A-8C are block diagrams that illustrate the use of a knowledge center to evaluate candidate UE actions for multiple UE agents.

FIG. 7 is a block diagram illustrating epochs generated from a series of data samples, according to an embodiment. FIG. 7 includes multiple data samples 702, 704, 706, 708, 710, and two epochs 712, 714. Data samples 702, 704, 706, 708, 710 are ordered from most recent the least recent, and could be stored in a database. Epoch 712 includes data samples 710, 706, and epoch 714 includes data samples 702, 706. Epochs 712, 714 could be used as training samples during DNN training.

Following the training of a DNN, knowledge regarding an environment is reflected in the neuron coefficients of the knowledge DNN (for example, the weights, thresholds, biases and/or activations of the neurons). The knowledge DNN could become specified to a certain region. For example, terrain, roads and buildings in the region could be reflected in any or all coefficients in the DNN. If a knowledge DNN is trained using many different UE transition experiences from many different receivers, the DNN might predict UE transitions in the environment more reliably. The generation of reliable predictions by a knowledge DNN could result in reduced signaling over wireless channels, as fewer reference signals might be needed to determine signal configurations.

Some inputs to a knowledge DNN have a relatively direct relationship with some outputs of the DNN. For example, an estimated geographic position of a UE could have a relatively strong correlation with a slow shadowing factor. If the knowledge DNN learns this relationship through several data samples reported from UEs at this position, the DNN might be likely to predict the slow shadowing factor for a new UE arriving at this position. In another example, time of day could have a relatively strong correlation with network traffic in some service regions, and more traffic could have a relatively strong correlation with increased interference. A DNN could learn of the correlation between time of day and interference from data samples reported by UEs at various times of the day.

NN technology derives useful predictions and/or signal configurations from multiple different parameters in a way that is difficult to achieve using conventional methods. For example, using conventional methods, signal configuration becomes complicated if both time and UE position are considered together. Moreover, conventional signal configuration methods might fail to predict which of time and UE position is most significant for the purposes of signal configuration. Considering additional parameters would further increase the complexity.

Neuron coefficients in a knowledge DNN are continuously or periodically updated to track changes in the environment. For example, a knowledge DNN could be updated by performing training periodically. Updating neuron coefficients too slowly is undesirable, as changes to the environment might not be reflected in the knowledge DNN. However, updating neuron coefficients too quickly is also undesirable. Updating a knowledge DNN too quickly could result from training the knowledge DNN using only recent information (for example, the most recently reported data samples), and ignoring older information. By way of example, consider a situation in which a large number of UEs are using a knowledge DNN to towards their own interests and the cumulative actions taken by the UEs change the environment in a negative way. If the knowledge DNN fails to update and catch these changes to the environment, the knowledge DNN could make poor predictions for future actions. Updating the knowledge DNN to reflect these changes to the environment too quickly might also have a negative effect on the environment. For example, rapidly updating the knowledge DNN based on these changes could strengthen data correlation and polarization in the knowledge center. To help prevent updating the knowledge DNN too quickly, the knowledge DNN is updated in a relatively random way. For example, as noted above, a knowledge center collects every data sample that is collected in an associated service region, and eliminates older data samples in a relatively random way. Therefore, it is possible that relatively old data samples will stay in the knowledge center for longer and participate in more training, and thus help avoid updating a knowledge DNN too quickly. The random selection of training sample epochs, as shown in FIG. 7, for example, could also help avoid updating a knowledge DNN too quickly. In some embodiments, a knowledge DNN includes recurrent layers (for example, RNN or LSMT architectures) that remember previous neuron weights, which could also or instead help avoid updating the DNN too quickly.

Various details relating to the generation of a knowledge center are described above. Embodiments relating to the use of a knowledge center to generate signal configurations will now be described in further detail.

A knowledge DNN is used to test candidate UE actions in an emulated environment. The knowledge DNN considers global state information and UE state information to evaluate a UE action and predict the transition to the next UE state. A scheduled transmission could be simulated by the knowledge DNN multiple times using different UE actions. For each UE action, the knowledge DNN provides a metric (for example, a UE reward) that evaluates the effectiveness of the UE action in the emulated environment.

When a UE is scheduled a job by the higher layer, a UE agent is created to generate a signal designs or configurations for the job. In some embodiments, the higher layer configures a target latency, T/P and/or code rate, for the job. The UE agent assembles UE state information into a UE_state(x;t) vector and generates a candidate UE_action (x;t) for UE-(x) at the moment t. The UE agent then sends the candidate UE_action(x;t) to a knowledge center, where the candidate UE_action(x;t) is evaluated in an emulated environment at a network level. The knowledge center returns a UE_reward(x;t) for the candidate UE_action(x;t). The evaluation at the knowledge center is specific to the UE and the current environment.

A UE agent could test multiple different UE_action(x;t) configurations to iteratively approach a suitable one (for example, a UE action that produces a desirable UE reward). If each candidate UE_action(x;t) was tested using a physical transmission in the environment and measured by a physical layer receiver, the searching process would be too expensive and slow for a practical deployment. The knowledge DNN allows for interactions with the true environment to be substituted with interactions with an emulated environment, which could be referred to as "experience replay".

Figures 8B, 8C:
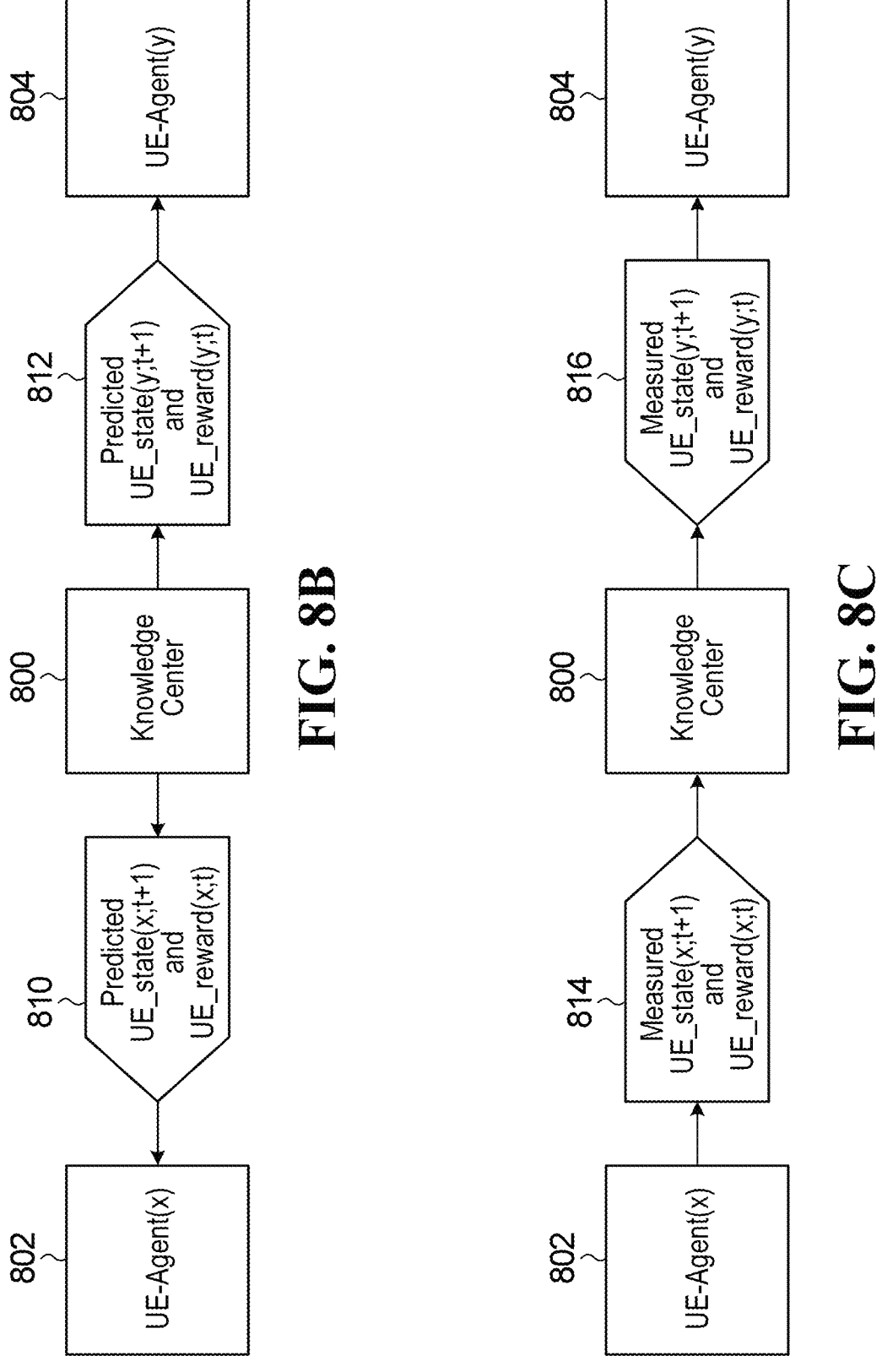

FIGS. 8A-8C are block diagrams that illustrate the use of a knowledge center 800 to evaluate candidate UE actions for multiple UE agents 802, 804. UE agent 802 is specific to a UE of index x, and UE agent 804 is specific to a UE of index y. UE-(x) and UE-(y) could be distinct UEs that are active in a service region of the knowledge center 800.

FIG. 8A illustrates the two candidate UE actions, UE_action(x;t) 806 and UE_action(y;t) 808, being sent from UE agent 802 and UE agent 804, respectively. The UE actions 806, 808 represent candidate signal configurations for scheduled transmissions to or from UE-(x) and UE-(y), respectively. Each of the UE actions 806, 808 are received by the knowledge center 800. As illustrated in FIG. 8B, the knowledge center 800 evaluates each of the UE actions 806, 808 and generates a respective prediction 810, 812. Prediction 810 includes UE_state(x;t+1) and UE_reward(x;t), and prediction 812 includes UE_state(y;t+1) and UE_reward(y; t). The generation of candidate actions at UE agents 802, 804 and the evaluation of the actions at the knowledge center 800, as shown in FIGS. 8A and 8B, could be performed multiple times until a suitable or final UE action is found for UE-(x) and for UE-(y). UE-(x) and UE-(y) then use the final UE actions to configure respective physical transmissions in the environment. Following the physical transmissions, UE agents 802, 804 report measurements back to the knowledge center 800. These measurements are illustrated in FIG. 8C at 814, 816 for UE agents 802, 804, respectively. Measurement 814 includes the measured UE_state(x;t+1) and UE_reward (x;t), and measurement 816 includes the measured UE_state (y;t+1) and UE_reward(y;t). Measurements 814, 816 could be stored in a database in the knowledge center 800, and could be later used to train a knowledge DNN.

In some embodiments, a UE agent includes one or more NNs or DNNs that generate actions for a UE. These DNNs could be referred to as signal generator DNNs, and will be denoted by the function sig_gen. The generation of a UE action using a signal generator DNN is represented as:

$$< \text{UE\_action}(x; t) > = \qquad \text{(Equation 2)}$$
$$\text{sig\_gen}( < \text{Global\_state}(t), \text{UE\_state}(x; t) >, \theta_{sig\_gen}).$$

In the equation above, $\theta_{sig\_gen}$ denotes the weights, thresholds, biases and/or activations for each neuron in the signal generator DNN.

Figure 9:
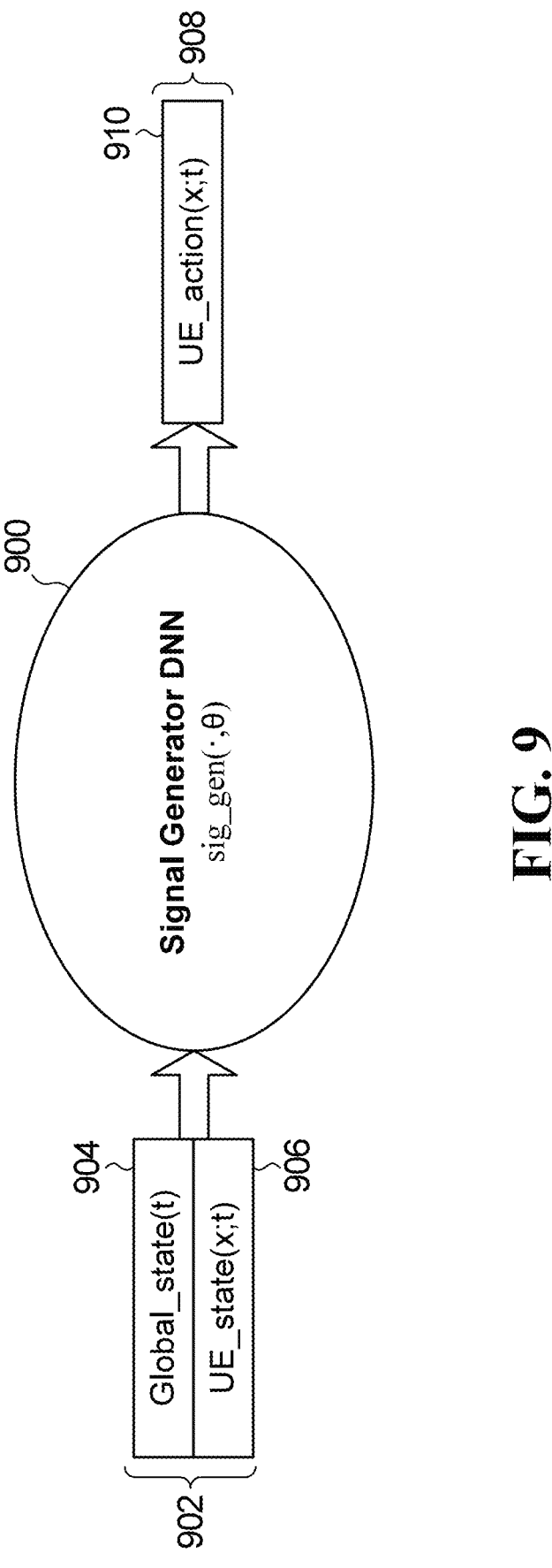
FIG. 9 is a block diagram illustrating a signal generator deep neural network (DNN) according to an embodiment of the disclosure.

FIG. 9 is a block diagram illustrating a signal generator DNN 900 according to an embodiment. The signal generator DNN 900 could be implemented in whole or in part in a computing system. An input image 902, which includes Global_state(t) 904 and UE_state(x;t) 906, is input into the signal generator DNN 900. An output image 908, which includes UE_action(x;t) 910, is output from the signal generator DNN 900. The output image 908 defines a candidate or final action for UE-(x) that is based on the information contained in the input image 902 and the training of the signal generator DNN 900. In the case that the signal generator DNN 900 has been trained. UE_action(x;t) 910 defines a signal configuration that produces a suitable UE reward when used for a physical transmission. However, in the case that the signal generator DNN 900 has not been trained, UE_action(x;t) 910 might not produce a suitable UE reward when used for a physical transmission.

UE actions that are generated by an untrained signal generator DNN are treated as candidate UE actions and tested using a knowledge DNN, as described above with reference to FIGS. 8A-8C. The knowledge DNN is used as environmental emulator to feedback a predicted UE reward and a predicted UE state to the signal generator DNN. For example, the predictions 810, 812 of FIG. 8B could be used to train respective signal generator DNNs in UE agents 802, 804 and produce improved UE actions. The UE agent could test multiple different action trajectories (for example, UE_action(t), UE_action(t+1), UE_action(t+2) . . . ) using the knowledge DNN until the signal generator DNN converges.

A signal generator DNN might not be a standalone function, but instead could be a representation of one or more different functions and/or DNNs. In some embodiments, a UE agent uses any of a number of different reinforcement learning models or functions to implement a signal generator DNN and generate UE actions. In some embodiments, a UE agent is a module that implements reinforcement learning models. A reinforcement learning model helps approach suitable UE actions for an environment. The selection of a reinforcement learning model could depend, at least in part, on the number of design dimensions and the size of each dimension (for example, the number of quantized values in a design dimension) in a UE action vector. The number of design dimensions and the size of each dimension define the function set for a UE action. A deep Q network (DQN), or a similar model, could be used when a UE agent is generating UE actions with a relatively small function set. Policy gradient methods, or a similar model, could be used when a UE agent is generating UE actions with a relatively large function set, or even a continuous function set (for example, one or more design dimensions include a continuous range of values).

Further details regarding reinforcement learning methods can be found in Richard S. Sutton and Andrew G. Barto. 1998. *Introduction to Reinforcement Learning* (1st ed.). MIT Press. Cambridge. MA. USA, which is incorporated by reference herein.

Embodiments relating to use of DQNs in a UE agent will now be discussed in detail. A DQN-based reinforcement learning model could help generate a suitable signal configuration for a finite function set that is bounded to an existing wireless standard. For example, a DQN could generate a final signal configuration from a set of candidate signal configurations. If every one of these candidate signal configurations are safe for use in the physical environment (for example, within the specifications of the wireless standard), then the final signal configuration generated by the DQN will also be safe. Therefore, a final signal configuration generated by a DQN is, in general, considered to be safe for use in the physical environment.

Figure 10:
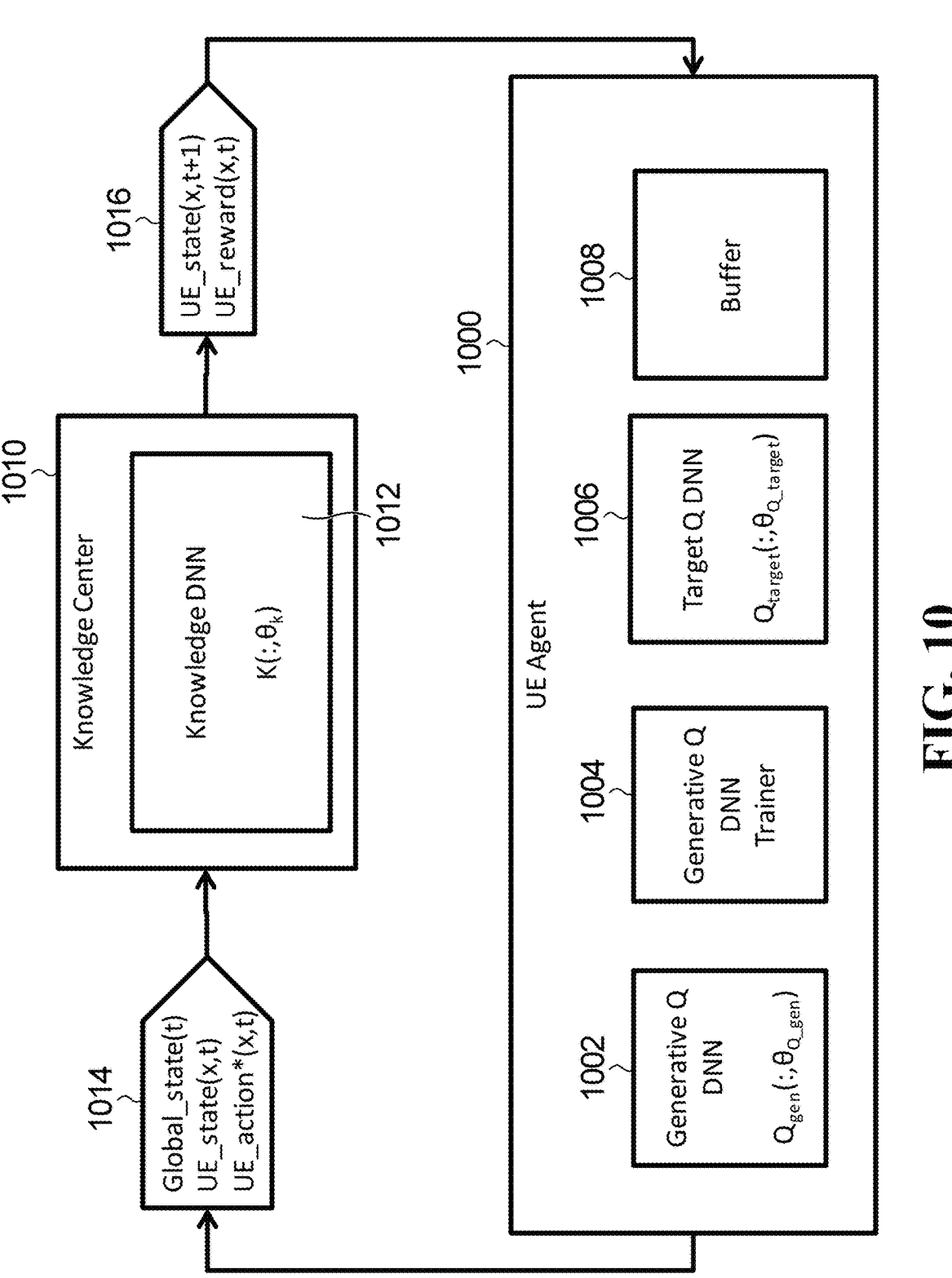
FIG. 10 is a block diagram illustrating an example implementation of a UE agent using deep Q network (DQN) methods.

FIG. 10 is a block diagram illustrating an example implementation of a UE agent 1000 using DQN methods. The UE agent 1000 includes a generative Q DNN 1002, a generative Q DNN trainer 1002, a target Q DNN 1006, and a buffer 1008. FIG. 10 further includes a knowledge center 1010 that includes a knowledge DNN 1012. The knowledge center 1010 could also include a database (not shown). The UE agent 1000 is coupled to or in communication with the knowledge center 1010. At 1014, FIG. 10 illustrates <Global_state(t), UE_state(t), UE_action*(t)> being transmitted to the knowledge center 1010 from the UE agent 1000. At 1016, FIG. 10 illustrates <UE_reward(t), UE_state (t+1)> being transmitted to the UE agent 1000 from the knowledge center 1010.

The UE agent 1000, generative Q DNN 1002, generative Q DNN trainer 1004, target Q DNN 1006, buffer 1008, knowledge center 1010 and/or knowledge DNN 1012 could be implemented using shared and/or separate computing systems.

The generative Q DNN 1002 is an example of a DQN. The input image for the generative Q DNN 1002 is <Global_state(t), UE_state(x;t), UE_action(x;t)>, and the output image for the generative Q DNN is <UE_reward(x; t)>. The generative Q DNN 1002 is denoted as the function $Q_{gen}$, where:

$$< \text{UE\_reward}(x; t) >= Q_{gen}( < \text{GLOBAL\_state}(t), \quad \text{(Equation 3)}$$

$$\text{UE\_state}(x; t), \text{UE\_action}(x; t) >, \theta_{Q\_gen}).$$

In the equation above, $\theta_{Q,gen}$ denotes the weights, thresholds, biases and/or activations for each neuron in the generative Q DNN 1002.

The UE agent 1000 uses the generative Q DNN 1002 to generate candidate or final UE actions for a scheduled transmission. The UE agent 1000 determines the time interval at which the UE actions should be taken. The UE agent 1000 inputs fixed <Global_state(t), UE_state(x;t)> vectors into the generative Q DNN 1002 and performs a search of different candidate UE actions to determine UE_action*(x; t). UE_action*(x;t) denotes the UE action that returns the highest predicted UE_reward(x;t) of the candidate UE actions. This iterative search of the generative Q DNN 1002 is represented by the expression:

$$\text{UE\_action}^*(x; t) = \qquad\qquad\qquad \text{(Equation 4)}$$

$$\underset{UE\_action(x;t)}{\text{argmax}} \ (Q_{gen}( < \text{Global\_state}(t), \text{UE\_state}(x; t), \text{UE\_action}_n(x; t) >, \theta_{Q\_gen}) \text{ for } n = 1 .. N_1).$$

In the equation above, $N_1$ is a integer that denotes the number of different values of UE_action(x;t) that are tested by the generative Q DNN 1002. The values of <Global_state (t), UE_state(x;t)> could be known by the UE agent 1000, and/or could be received from the knowledge center 1010.

The UE agent 1000 could use the signal configuration in UE_action*(x;t) to transmit signals over the wireless channel in accordance with a scheduled transmission, for example. The UE agent 1000 also collects and stores measured data samples from the true environment. For example, during a transmission to a physical receiver, the UE agent 1000 could collect and store <UE_state(x;t), UE_action*(x; t), Reward_measurement(x;t), UE_state(x;t+1)> vectors in the buffer 1008, which could be considered a local replay buffer. The UE agent 1000 periodically reports the measured data samples stored in the buffer 1008 to the knowledge center 1010 on the UL. The UE agent 1000 uses the measured state, UE_state(x;t+1), to form the next input to the generative Q DNN 1002 (for example, <Global_state(t+ 1), UE_state(x;t+1)>). The calculation of UE_action*(x;t+1) is represented by the expression:

$$\text{UE\_action}^*(x; t + 1) = \qquad\qquad\qquad \text{(Equation 5)}$$

$$\underset{UE\_action(x;t+1)}{\text{argmax}} \ (Q_{gen}( < \text{Global\_state}(t + 1), \text{UE\_state}(x; t + 1), \text{UE\_action}_n(x; t + 1) >, \theta_{Q\_gen}) \text{ for } n =$$

$$1 .. N_2).$$

In the equation above, $N_2$ is a integer that denotes the number of different values of UE_action(x;t+1) that are tested by the generative Q DNN 1002. The UE agent 1000 could use the same values of $\theta_{Q,gen}$ to generate a UE action at each time interval until the job has been completed. In some embodiments, UE_action*(x;t+1) may be different from UE_action*(x;t) if, for example, UE-(x) is moving.

Figure 11:
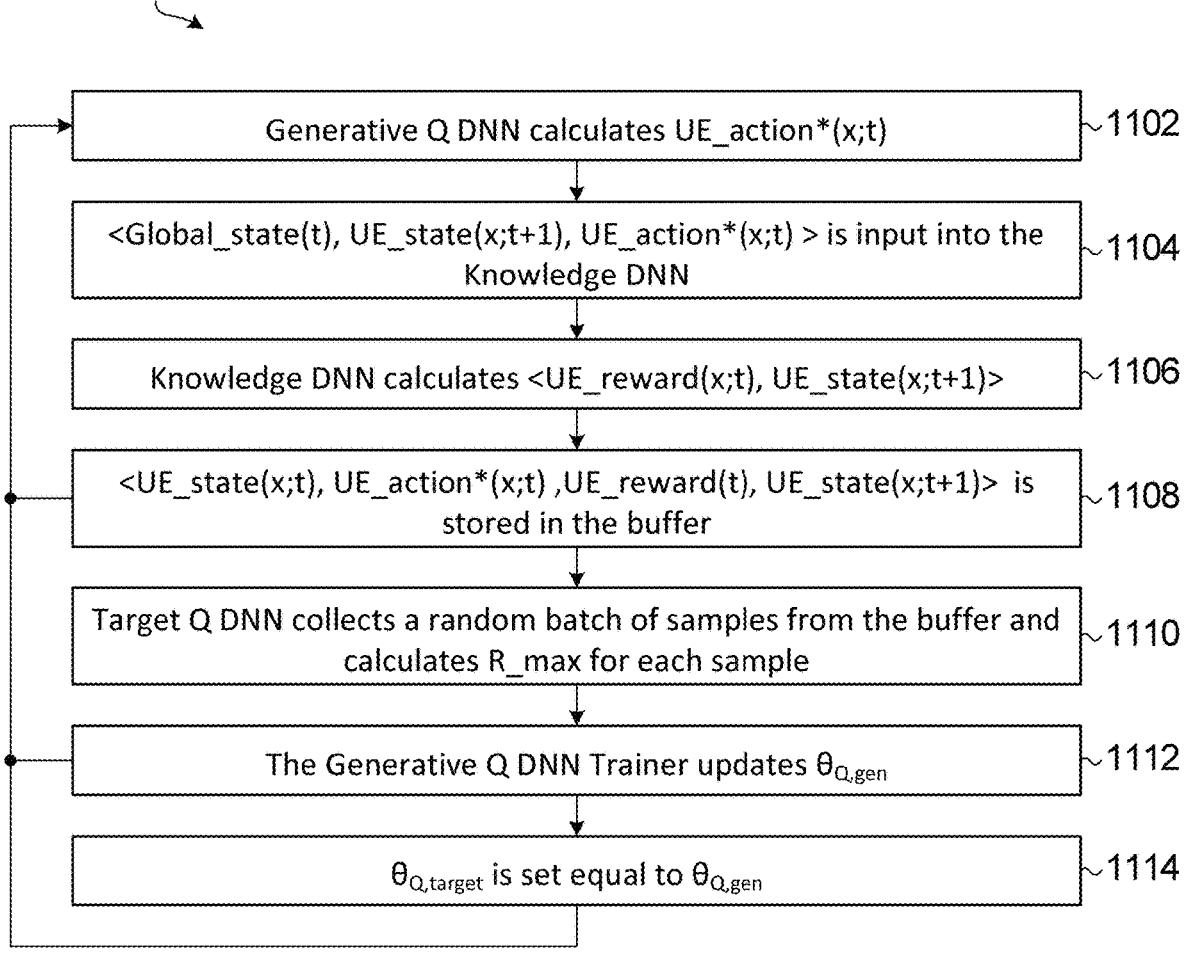
FIG. 11 is a flow diagram illustrating an example method for training a generative Q DNN.

In some embodiments, before final UE actions are determined by the generative Q DNN 1002, the values of $\theta_{Q,gen}$ are determined through training. FIG. 11 is a flow diagram illustrating an example method 1100 for training the generative Q DNN 1002. At the beginning of method 1100, the generative Q DNN 1002 is assumed to be untrained, and the values of $\theta_{Q,gen}$ are initialized randomly. However, this might not be the case in other embodiments. For example, the generative Q DNN 1002 could have been trained previously, and the values of $\theta_{Q,gen}$ could correspond to the previous training.

At step 1102, the generative Q DNN 1002 calculates UE_action*(x;t) by iteratively searching different values of UE_action(x;t) and using fixed values of <Global_state(t), UE_state(x;t+1)>. Step 1102 could be performing using the expression for UE_action*(x;t) described above, for example. As the generative Q DNN 1002 might not be trained at step 1102, UE_action*(x;t) might not be a suitable action for the UE. For example, UE_action*(x;t) might not result in a suitable value of UE_reward(x;t) during a transmission in the physical environment.

At step 1104, the value of UE_action*(x;t) calculated at step 1102, as well as the values of <Global_state(t), UE_state(x;t+1)> used at step 1102, are input to the knowledge DNN 1012, as illustrated at 1014 in FIG. 10. Step 1104 could also include inputting a random value of UE_action (x;t) to the knowledge DNN 1012 to help reduce data correlation. The knowledge DNN 1012 has been trained, and therefore could be considered to be an accurate representation of the current environment. At step 1106, the knowledge DNN 1012 calculates <UE_reward(x;t), UE_state(x;t+1)>, which could be performed using any of the methods described elsewhere herein. At step 1108, <UE_state(x;t), UE_action*(x;t),UE_reward(x;t), UE_state(x;t+1)> is input to the UE agent 1000 and stored in the buffer 1108, as illustrated at 1016 in FIG. 10.

Steps 1102, 1104, 1106, 1108 are repeated multiple times (as shown in FIG. 11 using a feedback arrow). These repetitions could build a set of <UE_state(x;t+1), UE_action*(x;t),UE_reward(t), UE_state(t+1)> data samples stored in the buffer 1108. The data samples stored in the buffer 1108 are then used by the target Q DNN 1006 for training purposes.

The target Q DNN 1006 has the same configuration and architecture as the generative Q DNN 1002. In method 1100, the neural coefficients of the target Q DNN 1006 ($\theta_{Q,target}$) are initialized with the same values as $\theta_{Q,gen}$. Step 1110 includes the target Q DNN 1006 collecting a random batch of data samples from the buffer 1008. Since each sample in the batch is selected randomly, the data samples are not specific to a particular time. A sample in the batch is denoted as <UE_state(i), UE_action(i),UE_reward(i), UE_state(i+ 1)>, where the variable i is a placeholder for time. The vector UE_state(i+1) represents the resulting UE state after UE_state(i) performs UE_action(i) in the emulated environment of the knowledge DNN 1012. Using the random batch of data samples, the target Q DNN 1006 tests multiple values of UE_action(i+1) for each UE_state(i+1) in the batch and determines the highest value of UE_reward(i+1). The highest value of UE_reward(i+1) that is calculated from the batch is denoted as R_max, and is represented using the expression:

$$R\_max = \max(Q_{target}( < Global\_state(t), UE\_state(i+1),$$ (Equation 6)

$$UE\_action_n(i+1) >, \theta_{Q,target}) \text{ for } n = 1 .. N_3).$$

In the equation above, $N_3$ is a integer that denotes the number of different values of UE_action(i+1) that are tested by the target Q DNN 1006. A different R_max is calculated for each sample in the batch that was collected by the target Q DNN 1006. Therefore, step 1110 generates a batch of R_max values.

At step 1112, the generative Q DNN trainer 1004 uses the batch of R_max values calculated at step 1110 to update values of $\theta_{Q,gen}$ for the generative Q DNN 1002. The generative Q DNN trainer 1004 calculates R_target(i) =R_max+UE_reward(i), and trains the generative Q DNN 1002 using a supervised gradient descent algorithm, for example. Using the input image <Global_state(t), UE_action(i), UE_state(i)>, the generative Q DNN trainer 1004 updates $\theta_{Q,gen}$ to have the output image of the generative Q DNN 1002 approach R_target(i).

As illustrated in FIG. 11, steps 1102, 1104, 1106, 1108, 1110, 1112 are repeated multiple times to iteratively update values of $\theta_{Q,gen}$ and train the generative Q DNN 1002. After a pre-defined number of iterations of steps 1102, 1104, 1106, 1108, 1110, 1112, $\theta_{Q,target}$ is set equal to $\theta_{Q,gen}$ at step 1114, and method 1100 is repeated again. After the UE reward calculated by the generative Q DNN 1002 converges with the UE reward calculated by the knowledge DNN 1012, the generative Q DNN 1002 has a final $\theta_{Q,gen}$ that is optimized for a job. As such, the UE agent 1000 could be considered to be trained for the job.

In some embodiments, as the UE is performing multiple transmissions to complete a job, measured values of UE reward are monitored by the UE agent 1000. If the measured UE rewards drop below a predetermined value or criteria, then the training of the generative Q DNN is considered aged, and method 1100 is performed again.

As noted above, a DQN might not be suitable for UE actions with large function sets. For example, when using a DQN to determine a final UE action to complete a higher layer job, a Q DNN might exhaustively search through a set of multiple different candidate UE actions in a finite searching space and select the action that produces the highest UE reward. If the searching space is large, or even infinite, an exhaustive search might not be practical or possible. An alternative to a DQN is a policy gradient reinforcement model. Policy gradient-based reinforcement learning models could help generate a suitable signal design in a large function set, or even an infinite function set, that might not be bounded to any existing wireless standard.

Using a policy gradient model, a UE agent could have two different DNNs: a Q DNN similar to those discussed above, and a policy DNN. A policy DNN will be denoted as a π DNN. For a π DNN, an input image could be of the form <Global_state(t), UE_state(x;t)>, and an output image could be <UE_action*(x;t)>, which represents the UE action that returns the highest predicted UE reward. As such, a π DNN directly produces final or candidate UE actions without performing exhaustive searching.

Figure 12:
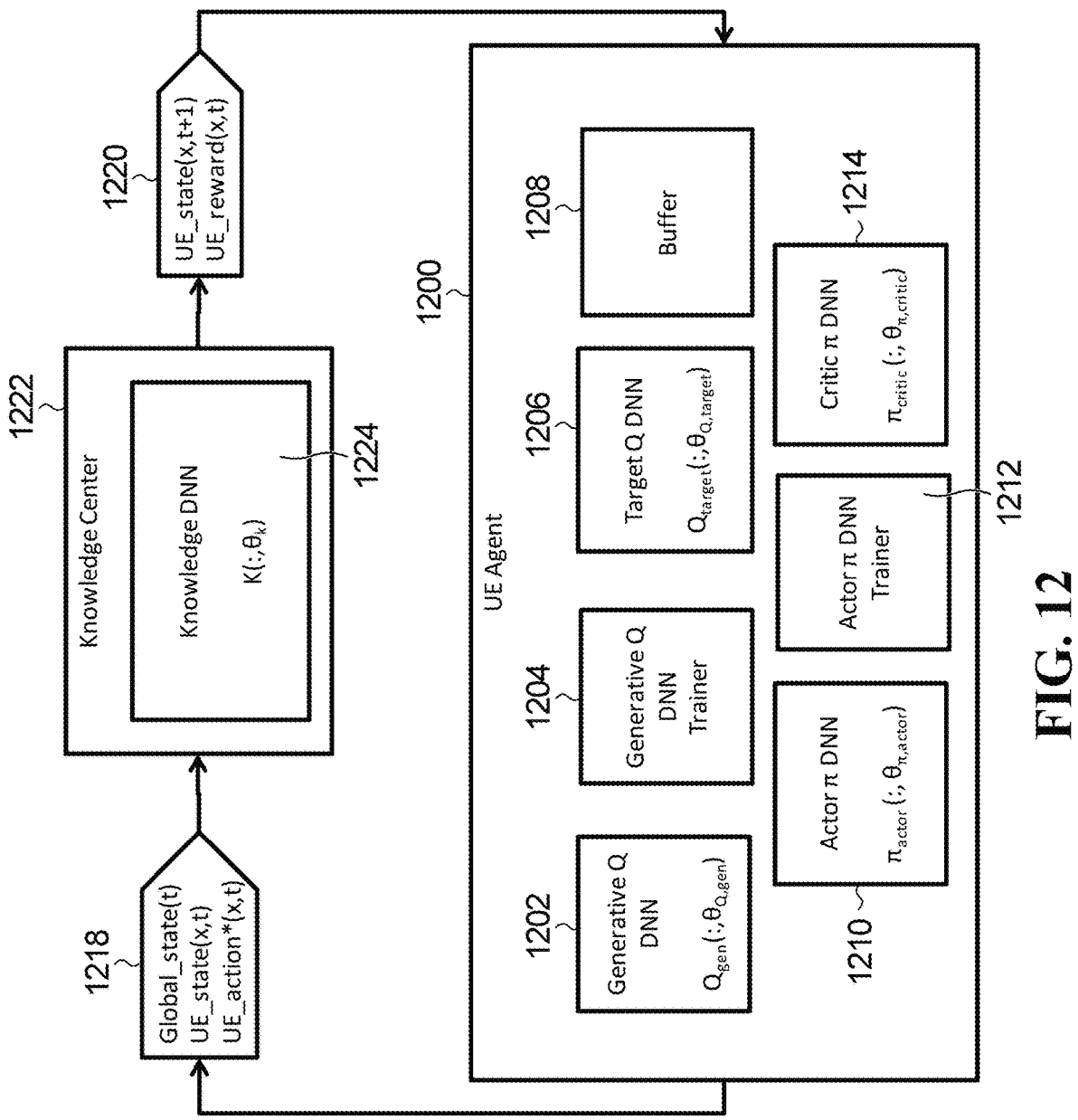
FIG. 12 is a block diagram illustrating an example implementation of a UE agent using policy gradient methods.

Embodiments relating to use of policy gradients in a UE agent will now be discussed in detail. FIG. 12 is a block diagram illustrating an example implementation of a UE agent 1200 using policy gradient methods. The UE agent 1200 includes a generative Q DNN 1202, a generative Q DNN trainer 1204, a target Q DNN 1206, and a buffer 1208, any or all of which could be similar to the generative Q DNN 1002, the generative Q DNN trainer 1004, the target Q DNN 1006, and the buffer 1008 of FIG. 10, respectively. The UE agent 1200 further includes an actor π DNN 1210, an actor π DNN trainer 1212 and a critic π DNN 1214. The actor π DNN 1210, the actor π DNN trainer 1212 and the critic π DNN 1214 could be implemented using shared or separate computing systems.

FIG. 12 also includes a knowledge center 1222 that includes a knowledge DNN 1224, either or both of which could be similar to the knowledge center 1010 and the knowledge DNN 1012 of FIG. 10. The UE agent 1200 is coupled to or in communication with the knowledge center 1222. At 1218, FIG. 12 illustrates <Global_state(t), UE_state(t), UE_action*(t)> being transmitted to the knowledge center 1222 from the UE agent 1000. At 1220, FIG. 12 illustrates <UE_reward(t), UE_state(t+1)> being transmitted to the UE agent 1200 from the knowledge center 1222.

The UE agent 1200 uses the actor π DNN 1210 to generate candidate or final UE actions for a scheduled transmission. The UE agent 1200 determines the time interval at which the UE actions should be taken, and the UE agent 1200 inputs <Global_state(t), UE_state(x;t)> vectors into the actor π DNN 1210 to generate UE_action*(x;t). At time t, the generation of a UE action by the actor π DNN 1210 is denoted as:

$$UE\_action^*(x; t) =$$ (Equation 7)

$$\pi\_actor( < Global\_state(t), UE\_state(x; t) >, \theta_{\pi,actor}).$$

In the equation above, $\theta_{\pi,actor}$ denotes the weights, thresholds, biases and/or activations for each neuron in the actor π DNN 1210. The values of <Global_state(t), UE_state(x; t)> could be known by the UE agent 1200, and/or could be received from the knowledge center 1222. The UE agent 1200 uses the signal configuration in UE_action*(x;t) to transmit signals over the wireless channel in accordance with a scheduled transmission, for example. The UE agent 1200 also collects and stores measured data samples from the true environment. For example, during a transmission to a physical receiver, the UE agent 1200 could collect and store <UE_state(x;t), UE_action*(x;t), Reward_measurement(x;t), UE_state(x;t+1)> in the buffer 1208. The UE agent 1200 periodically reports the measured data samples stored in the buffer 1208 to the knowledge center 1222 on the UL. The UE agent 1000 uses the measured state to form the next input to the actor π DNN 1210 (for example, <Global_state(t+1), UE_state(x;t+1)>). The calculation of UE_action*(x;t+1) is represented by the expression:

$$UE\_action^*(x; t+1) =$$ (Equation 8)

$$\pi\_actor( < Global_{state(t+1)}, UE_{state(x;t+1)} >, \theta_{\pi,actor}).$$

The UE agent 1200 could use the same values of $\theta_{\pi,actor}$ to generate a UE action at each time interval until the job has been completed.

In some embodiments, before final UE actions are determined by the actor n DNN 1210, the values of $\theta_{\pi,actor}$ are determined through training. FIG. 13 is a flow diagram illustrating an example method 1300 for training the actor π DNN 1210. In method 1300, the actor π DNN 1210 is assumed to be untrained. For example, the values of $\theta_{\pi,actor}$ could be initialized randomly. The values of $\theta_{Q,gen}$ and $\theta_{Q,target}$ for the generative Q DNN 1202 and the target Q DNN 1206, respectively, could also be initialized randomly. As such, the generative Q DNN 1202 and the target Q DNN 1206 is considered to be untrained at the start of method 1300. However, the actor π DNN 1210, the generative Q DNN 1202, and/or the target Q DNN 1206 might not be untrained in all embodiments. For example, the actor π DNN 1210 could have been trained previously, and the values of $\theta_{\pi,actor}$, $\theta_{Q,gen}$ and/or $\theta_{Q,target}$ could correspond to the previous training.

At step 1302, the actor n DNN 1210 calculates UE_action*(x;t). Step 1302 could be performed using the expression for UE_action*(x;t) described above, for example. However, because the actor π DNN 1210 might not be trained at step 1302, the UE_action*(x;t) vector that is calculated might not be a suitable action for the UE.

At step 1304, the value of UE_action*(x;t) calculated at step 1302, as well as the values of <Global_state(t), UE_state(x;t+1)> used at step 1302, are input to the knowledge DNN 1224, as illustrated at 1218 in FIG. 12. Step 1304 could also include inputting a random value of UE_action (x;t) to the knowledge DNN 1224 to help reduce data correlation. The knowledge DNN 1224 has been trained, and therefore is considered to be an accurate representation of the current environment. At step 1306, the knowledge DNN 1224 calculates <UE_reward(x;t), UE_state(x;t+1)>, which could be performed using any of the methods described elsewhere herein. At step 1308, <UE_state(x;t), UE_action* (x;t),UE_reward(x;t), UE_state(x;t+1)> is input to the UE agent 1200 and stored in the buffer 1208, as illustrated at 1220 in FIG. 12.

As indicated in FIG. 13, steps 1302, 1304, 1306, 1308 are repeated multiple times. These repetitions build a set of <UE_state(x;t+1), UE_action*(x;t),UE_reward(t), UE_state (t+1)> data samples stored in the buffer 1308.

Step 1310 includes the critic π DNN 1214 collecting a random batch of data samples from the buffer 1208. The critic π DNN 1214 has the same configuration and architecture as the actor π DNN 1210. In method 1300, the neural coefficients of the critic π DNN 1214 ($\theta_{\pi,critic}$) are initialized with the same values as $\theta_{\pi,actor}$. Each sample in the batch collected by the critic π DNN 1214 is denoted as <UE_state (i), UE_action(i),UE_reward(i), UE_state(i+1)>. Step 1310 further includes the critic π DNN 1214 calculating UE_action*(i+1) for each data sample in the batch using, for example, the expression:

$$\text{UE\_action}^*(x; i + 1) = \qquad\qquad \text{(Equation 9)}$$

$$\pi\_\text{critic}( < \text{Global\_state}(t),\, \text{UE\_state}(i + 1) >,\, \theta_{\pi,critic}).$$

As such, step 1310 could generate a batch of UE_action* (i+1) vectors associated with the collected batch of data samples. At step 1312, the target Q DNN 1206 uses the batch of UE_action*(i+1) vectors to generate a corresponding batch of R_max values. For example, each R_max value could be generated using the expression:

$$\text{R\_max} = Q_{target}( < \text{Global\_state}(t), \qquad \text{(Equation 10)}$$

$$\text{UE\_state}(i + 1),\, \text{UE\_action}(i + 1) >,\, \theta_{Q,target}).$$

At step 1314, the generative Q DNN trainer 1204 uses the batch of R_max values calculated at step 1312 to update values of $\theta_{Q,gen}$ for the generative Q DNN 1202. The generative Q DNN trainer 1204 calculates R_target(i)=R_max+UE_reward (i), and trains the generative Q DNN 1202 using a supervised gradient descent algorithm, for example. Using the input image <Global_state(t), UE_action(i), UE_state(i)>, the generative Q DNN trainer 1204 updates $\theta_{Q,gen}$ to have the output image of the generative Q DNN 1202 approach R_target(i).

At step 1316, the actor π DNN trainer 1214 updates $\theta_{\pi,actor}$ for the actor π DNN 1210. For example, the actor π DNN trainer 1214 could update the values of $\theta_{\pi,actor}$ to increase the value of the expression:

$$Q_{gen}( < \text{Global\_state}(t),\, \text{UE\_state}(i), \qquad \text{(Equation 11)}$$

$$\pi\_\text{actor}( < \text{Global\_state}(t),\, \text{UE\_state}(i) >,\, \theta_{\pi,actor} ) >,\, \theta_{Q,gen}).$$

When changing the value of $\theta_{\pi,actor}$, the actor π DNN 1210 will generate a different UE action for fixed values of Global_state(t) and UE_state(i), and this UE action will result in the generation of a different UE reward from the generative Q DNN 1202. For example, in some cases, changing $\theta_{\pi,actor}$ could result in the generation of a UE action with increased predicted throughput. This UE action with increased predicted throughput would be evaluated using the generative Q DNN 1202, and the UE reward could increase or decrease based on the weight associated with throughput.

As illustrated in FIG. 13, steps 1302, 1304, 1306, 1308, 1310, 1312, 1314, 1316 are repeated multiple times to iteratively update values of $\theta_{Q,gen}$ and $\theta_{\pi,actor}$. After a pre-defined number of iterations of steps 1302, 1304, 1306, 1308, 1310, 1312, 1314, 1316, method 1300 proceeds to step 1318. At step 1318, $\theta_{Q,target}$ is set equal to $\theta_{Q,gen}$, and $\theta_{\pi,critic}$ is set equal to $\theta_{\pi,actor}$. Method 1300 is then be repeated, as illustrated in FIG. 13. After the UE reward calculated by the generative Q DNN 1002 converges with the UE reward calculated by the knowledge DNN 1012, the actor π DNN 1210 has a final $\theta_{\pi,critic}$ that is optimized for a job. As such, the UE agent 1200 could be considered trained for the job. In some embodiments, as the UE is performing multiple transmissions to complete a job, measured values of UE reward are monitored by the UE agent 1200. If measured UE rewards drop below a predetermined value or criteria, then the training of the generative Q DNN 1202 and the actor π DNN 1210 is considered aged, and method 1300 could be performed again.

As noted above, the training of a policy gradient model might not be bounded to any wireless standard. In general, a policy gradient could search a large or even infinite set of signal configuration parameters to determine a suitable signal configuration for a UE. As such, the policy gradient model could generate an improved air interface design for any UE in a radio environment. The policy gradient model could even design beyond a wireless standard, and might allow for the design or customization of a new air interface.

The UE agents 1000, 1200 illustrated in FIGS. 10 and 12, respectively, are generated and/or updated when a UE is scheduled a job by the higher layers. Generating and/or updating a UE agent could include generating and/or updating a signal generator DNN, local reinforcement learning models, DQNs and/or policy gradients, for example. As illustrated in FIGS. 11 and 13, for example, a UE agent could be trained by interacting candidate signal configurations with an emulated environment. The emulated environment contains knowledge of the region and previous experience reported by multiple UEs, and therefore the training of the UE agent could be based on UE state information and the global network state. The UE agent approaches a suitable design by iteratively testing different candidate signal configurations in the emulated environment and updating the UE agent based on the results. The UE agent is not a true radio environment but an emulated one, and as such the UE agent does not consume physical radio resources when generating and testing the candidate signal designs.

The configuration of signals is driven by the reward metric at the UE agent and/or knowledge center. As such, the configuration of UE_reward(x;t) is an important factor for determining the direction of UE agent training. As illustrated in FIGS. 10 and 12, a UE agent could be trained to increase or optimize the value of UE_reward(x;t). By configuring UE_reward(x;t) to emphasize certain parameters, the same emphasis could be trained into the UE agent and reflected in the UE_action(x;t) vectors that are generated by the UE agent. Consider, for example, the generation of the UE reward illustrated in FIG. 3. The value of UE_reward(t) 328 is based on the weights 310, 312, 314, 316. If weight 316 is adjusted to place an emphasis on reducing latency, a UE agent using this configuration of UE reward would be trained to design UE actions with relatively low UE latency. As such, changing the weights 310, 312, 314, 316 can pull the training of a DNN towards a new rewarding direction. The reduction of UE latency in this example could come at the cost of other parameters, such as BLER. In a sense, the configuration of UE_reward(x;t) is a training tool that a UE agent can use to affect the priority of certain signal parameters. The reward metric can be re-configured even if a UE agent and/or a knowledge center is operating. The new reward configuration could gradually propagate and affect the design of the signals for every active UE.

After a UE agent develops/trains a signal generator DNN, a UE agent begins to schedule the UE to transmit physical signals according to UE actions determined by the signal generator DNN. The UE agent measures the UE reward and next UE state in the true environment and uses this information to help generate the next UE action. The UE performs these steps iteratively until a job is completed. At the same time, the UE agent stores the measured transitions that result from the interaction with the true environment, and periodically reports the transitions to a database in a knowledge center.

The configuration of signals by a UE agent could depend on any of a variety of different factors. Some global changes, such as rain, snow, working hours and traffic jams, for example, affect an environment at a large scale. These changes propagate down to the design and configuration of the signals for each active UE. The knowledge DNN could have knowledge of these changes through training. The global changes alter the predications generated by the knowledge center, which in turn changes the configuration of UE signals.

FIGS. 11 and 13 illustrate example methods for training DNNs at respective UE agents. Other methods are also contemplated.

FIG. 14 is a flow diagram illustrating an example method 1700 according to an embodiment the present disclosure. The method 1700 could be performed by a knowledge center implemented at a base station, for example. The method 1700 includes multiple steps 1702, 1704, 1706, 1708, 1710.

Step 1702 includes collecting a plurality of data samples. Each data sample could include information associated with a respective physical transmission in a radio environment. Examples of data samples are illustrated in FIG. 5, for example. Collecting the plurality of data samples could include receiving the plurality of data samples from multiple network devices (for example, one or more UE(s) and/or base station(s)) and storing the plurality of data samples in a database (for example, database 604 of FIG. 6). In some implementations, storing the plurality of data samples in the database includes deleting a plurality of older data samples from the database.

Step 1704 includes training a first neural network associated with the radio environment using a subset of the plurality of data samples. In some implementations, the first neural network is a knowledge DNN that is trained using a gradient ascent or gradient descent algorithm, for example.

Step 1706 includes receiving a candidate signal configuration for a scheduled transmission in the radio environment (for example, UE_action(x;t)). In some embodiments, the candidate signal configuration is received from a second neural network that is associated with a UE. The second neural network could be a generative Q DNN or an actor π DNN, for example, which is implemented at a UE agent. The candidate signal configuration might not be received directly from the second neural network, but could instead be received from a database that is in communication with both the first and second neural networks, for example.

Step 1708 is an optional step that includes receiving information associated with a state of the UE (for example, UE_state(x;t)) and information associated with the radio environment (for example, Global_state(t)). The information associated with a state of the UE and/or the information associated with the radio environment could be output from the second neural network.

Step 1710 includes evaluating, using the trained first neural network, the candidate signal configuration to produce an evaluation of the candidate signal configuration. The evaluation of the candidate signal configuration could be used for training the second neural network, for example. Evaluating the candidate signal configuration could include inputting the candidate signal configuration, the information associated with the state of the UE and the information associated with the radio environment into the trained first neural network. In some implementations, the evaluation of the candidate signal configuration includes a metric representing a predicted effectiveness of the candidate signal configuration in the radio environment (for example, UE_reward(x;t)) and information associated with a predicted state of the UE after performing the scheduled transmission to or from the UE using the candidate signal configuration (for example, UE_state(x;t+1)).

In some embodiments, the first neural network could be trained at step 1704 using data samples that are associated with UEs that are different from the UE associated with the second neural network. For example, the UE associated with the second neural network might be a first UE, and at least one data sample of the plurality of data samples collected at step 1702 includes information that is associated with a physical transmission to or from a second UE in the radio environment. Therefore, information collected from the second UE could be used to evaluate signal configurations for the first UE. The information associated with the physical transmission to or from the second UE could include: a first state of the second UE before the physical transmission to or from the second UE (for example, UE_state(y;t)); transmission parameters associated with the physical transmission to or from the second UE (for example, UE_action(y;t)); a second state of the second UE after the physical transmission to or from the second UE (for example, UE_state(y;t+1)); and a metric representing an effectiveness of the physical transmission to or from the second UE in the radio environment (for example, UE_reward(y;t)). The metric could include a weighted sum of a plurality of measurements associated with the physical transmission to or from the second UE (for example, UE_reward(t) 328 of FIG. 3).

In some embodiments, the first neural network could evaluate candidate signal configurations for multiple different UEs. For example, steps 1706, 1708, 1710 could be repeated for a third neural network that is associated with a different UE.

FIG. 15 is a flow diagram illustrating an example method 1800 according to an embodiment the present disclosure. The method 1800 could be performed by a UE agent implemented at a base station, for example. The method 1800 includes multiple steps 1802, 1804, 1806, 1808, 1810, 1812, 1814, 1816.

Step 1802 includes generating, using a first neural network associated with a UE, a candidate signal configuration for a scheduled transmission in a radio environment. Examples of generating a candidate signal configuration are illustrated in steps 1102 and 1302 of FIGS. 11 and 13, respectively.

Step 1804 is an optional step that includes sending, to a second neural network associated with the radio environment, the candidate signal configuration, information associated with a state of the UE and information associated with the radio environment. Examples of step 1804 are illustrated in steps 1104 and 1304 of FIGS. 11 and 13, respectively.

Step 1806 includes receiving an evaluation of the candidate signal configuration. This evaluation could be similar to the evaluation generated at step 1710 of FIG. 14, for example. The evaluation could be received from the second neural network. In such cases, the evaluation could be received directly from the second neural network, or from a database that is in communication with the first and second neural networks. Examples of receiving an evaluation of a candidate signal configuration are illustrated in steps 1108 and 1308 of FIGS. 11 and 13, respectively.

Step 1808 includes training the first neural network based on the evaluation of the candidate signal configuration. The training could include the use of a reinforcement learning model. Examples of training the first neural network are illustrated in steps 1110, 1112, 1114 of FIG. 11, and steps 1310, 1312, 1314, 1316, 1318 FIG. 13.

Step 1810 includes generating, using the trained first neural network, for example, a final signal configuration for the scheduled transmission in the radio environment. This final signal configuration could be used in by the UE to perform a physical transmission to complete a higher-layer job. For example, step 1812 is an optional step that includes sending the final signal configuration to a network device to perform the scheduled transmission in the radio environment. In some embodiments, the network device could be or include the UE associated with first neural network and the scheduled transmission is performed from the UE. In other embodiments, the network device could be or include a base station and the scheduled transmission is performed from the base station to the UE associated with the first neural network.

The UE associated with the first neural network could also perform measurements to help train the second neural network, for example. Step 1814 is an optional step that includes determining, after the network device performs the scheduled transmission, a plurality of measurements associated with the scheduled transmission, and step 1816 is an optional step that includes sending the plurality of measurements to a database associated with the second neural network.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for obtaining a wireless signal configuration, the method comprising:
collecting a plurality of data samples, each data sample, among the plurality of data samples, providing information associated with a respective physical transmission in a radio environment;
training, using a subset of the plurality of data samples, a first neural network associated with the radio environment, the training resulting in a trained first neural network;
obtaining, from a second neural network specific to a single user equipment (UE):
a first candidate wireless signal configuration for a scheduled transmission to or from the single UE in the radio environment;
information associated with a state of the single UE; and
information associated with the radio environment;
inputting, into the trained first neural network:
the first candidate wireless signal configuration;
the information associated with the state of the single UE; and
the information associated with the radio environment;
obtaining, from the trained first neural network, a value for an evaluation metric, the evaluation metric representing a predicted effectiveness of the first candidate wireless signal configuration; and adjusting, based on the value for the evaluation metric, the first candidate wireless signal configuration to obtain a second candidate wireless signal configuration.

2. The method of claim 1, wherein the first neural network includes first weights, the method further comprising updating the first weights.

3. The method of claim 2, wherein the updating acts to adapt the first neural network to changing conditions in the radio environment.

4. The method of claim 2, wherein the training the first neural network comprises acting to optimize a value of a reward.

5. The method of claim 4, further comprising determining the value of the reward.

6. The method of claim 5, wherein determining the value of the reward comprises evaluating a reward function.

7. The method of claim 6, wherein the reward function associates the value of the reward with the information associated with the state of the single UE, including one or more of: throughput; latency; or error rate.

8. The method of claim 6, wherein determining the value of the reward comprises re-evaluating the reward function responsive to changing conditions in the radio environment.

9. The method of claim 6, wherein the updating the first weights comprises using a policy gradient model to update the first weights based on the reward function.

10. The method of claim 1, wherein the data samples include information associated with a geographic location of the single UE.

11. The method of claim 1, wherein the data samples include environmental factors.

12. The method of claim 11, wherein the environmental factors comprise weather conditions.

13. The method of claim 11, wherein the environmental factors comprise time of day.

14. The method of claim 11, further comprising adjusting, based on the environmental factors, the reward function.

15. A method for obtaining a wireless signal configuration, the method comprising:

collecting a plurality of data samples, each data sample, among the plurality of data samples, providing information associated with a respective physical transmission in a radio environment;

training, using a subset of the plurality of data samples, a first neural network associated with the radio environment, the training resulting in a trained first neural network;

obtaining, from a second neural network specific to a user equipment (UE):

a first candidate wireless signal configuration for a scheduled transmission to or from the UE in the radio environment;

information associated with a state of the UE; and information associated with the radio environment;

inputting, into the trained first neural network:

the information associated with the state of the UE; and the information associated with the radio environment;

obtaining, from the trained first neural network, a value for an evaluation metric, the evaluation metric representing a predicted effectiveness of the first candidate wireless signal configuration; and adjusting, based on the value for the evaluation metric, the first candidate wireless signal configuration to obtain a second candidate wireless signal configuration, wherein the evaluation metric comprises a weighted sum of values for the information associated with the state of the UE, the weighted sum defined by a plurality of weights, wherein each weight, among the plurality of weights, is associated with a corresponding one of the values for the information associated with the state of the UE.

16. The method of claim 15, wherein the information associated with the state of the UE comprises one or more of: predicted throughput; latency; or error rate.

17. The method of claim 15, wherein the method is carried out by a reinforcement learning agent, the method further comprising:

obtaining a measurement of performance associated with the reinforcement learning agent; and adjusting, based on the measurement, a given weight, among the plurality of weights.

18. The method of claim 15, further comprising adjusting a given weight, among the plurality of weights, responsive to changing conditions in the radio environment.

19. The method of claim 1, further comprising storing the second candidate wireless signal configuration and an associated evaluation metric in a database for future reference and retraining of the first neural network and the second neural network.

20. A system for wireless signal configuration optimization, comprising:

at least one processor coupled with a memory;

storing instructions that, when executed by the at least one processor, cause the system to perform the method of claim 1; and a database storing the plurality of data samples and the second candidate wireless signal configuration.

21. The system of claim 20, wherein the instructions, when executed by the at least one processor, cause the system to:

collect new data samples collected from further physical transmissions in the radio environment; and retrain, using the new data samples, the first neural network to obtain a retrained first neural network defined by retrained neural network parameters.

22. The system of claim 20, wherein the instructions, when executed by the at least one processor, cause the system to update the database with the new data samples and the retrained neural network parameters.

23. The system of claim 20, wherein the memory further stores a reinforcement learning model for the second neural network; and the instructions, when executed by the at least one processor, cause the system further to:

provide, to the second neural network, feedback from the first neural network;

provide, to the second neural network, an adjusted reward function; and obtain, from the second neural network, an updated first candidate wireless signal configuration, the updated first candidate wireless signal configuration based on applying the reinforcement learning model to the feedback and the adjusted reward function.

* * * * *